(12) United States Patent
Edgar

(10) Patent No.: US 7,263,240 B2
(45) Date of Patent: *Aug. 28, 2007

(54) METHOD, SYSTEM, AND SOFTWARE FOR IMPROVING SIGNAL QUALITY USING PYRAMIDAL DECOMPOSITION

(75) Inventor: Albert D. Edgar, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 807 days.

This patent is subject to a terminal disclaimer.

(21) Appl. No.: 10/342,154

(22) Filed: Jan. 14, 2003

(65) Prior Publication Data

US 2004/0028288 A1    Feb. 12, 2004

Related U.S. Application Data

(60) Provisional application No. 60/348,821, filed on Jan. 14, 2002.

(51) Int. Cl.
*G06K 9/40* (2006.01)
*G06K 9/36* (2006.01)
*G06K 9/46* (2006.01)
*H04N 1/409* (2006.01)

(52) U.S. Cl. .................. 382/254; 382/240; 382/260

(58) Field of Classification Search ............. 382/254, 382/260, 264, 266, 275, 284, 283, 298, 299, 382/240; 358/3.26, 3.27, 1–9, 413, 3.24, 358/463

See application file for complete search history.

(56) References Cited

U.S. PATENT DOCUMENTS 2,404,138 A    7/1946    Mayer .......................... 95/94

(Continued)

FOREIGN PATENT DOCUMENTS

EP    0 261 782 A2    8/1987

(Continued)

OTHER PUBLICATIONS

"*Adaptive Fourier Threshold Filtering: A Method to Reduce Noise and Incoherent Artifacts in High Resolution Cardiac Images*", Doyle, M., et al., 8306 Magnetic Resonance in Medicine 31, No. 5, Baltimore, MD, May, pp. 546-550, 1994.

(Continued)

*Primary Examiner*—Yon J. Couso
(74) *Attorney, Agent, or Firm*—Simon, Galasso & Frantz, PLC; David A. Novais; Kathleen Neuner Mann

(57) ABSTRACT

A method, system, and software are disclosed for improving the quality of a signal. A base signal is recursively decomposed for a desired number of pyramid levels. The decomposed signal from the lowest level is modified to generate a preprocessed signal. The preprocessed signal from the lowest level is used to improve signal components or characteristics of the decomposed signal of the next higher level of the pyramidal decomposition, resulting in a modified signal at the next higher level. In one embodiment, the preprocessed signal includes filter mask that is used to guide a filtering process on the decomposed signal of the next higher level. In another embodiment, the preprocessed signal includes a up-predicted signal that is combined with the decomposed signal of the next higher level. The preprocessed signal from a lower level is used to generate a modified signal at a higher level. The generation of a preprocessed signal and a modified signal is recursively repeated for each level until the highest level of the pyramidal decomposition is reached, resulting in an improved base signal. The present invention finds particular application in photography and digital film processing, whereby the illustrated method may be used to reduce image noise, thereby improving image quality.

55 Claims, 11 Drawing Sheets

U.S. PATENT DOCUMENTS

| | | | |
|---|---|---|---|
| 3,520,689 A | 7/1970 | Nagae et al. ................... 96/55 |
| 3,520,690 A | 7/1970 | Nagae et al. ................... 96/55 |
| 3,587,435 A | 6/1971 | Chioffe .......................... 95/89 |
| 3,615,479 A | 10/1971 | Kohler et al. ................... 96/48 |
| 3,615,498 A | 10/1971 | Aral ............................... 96/55 |
| 3,617,282 A | 11/1971 | Bard .............................. 96/59 |
| 3,747,120 A | 7/1973 | Stemme ......................... 346/75 |
| 3,833,161 A | 9/1974 | Krumbein ..................... 226/92 |
| 3,903,541 A | 9/1975 | Von Meister et al. ........ 354/317 |
| 3,946,398 A | 3/1976 | Kyser et al. ................... 346/1 |
| 3,959,048 A | 5/1976 | Stanfield et al. .............. 156/94 |
| 4,026,756 A | 5/1977 | Stanfield et al. ............. 156/554 |
| 4,081,577 A | 3/1978 | Horner ......................... 427/424 |
| 4,142,107 A | 2/1979 | Hatzakis et al. ............. 250/571 |
| 4,215,927 A | 8/1980 | Grant et al. .................. 354/317 |
| 4,249,985 A | 2/1981 | Stanfield ...................... 156/554 |
| 4,265,545 A | 5/1981 | Slaker .......................... 356/431 |
| 4,301,469 A | 11/1981 | Modeen et al. ............... 358/75 |
| 4,490,729 A | 12/1984 | Clark et al. ................... 346/75 |
| 4,501,480 A | 2/1985 | Matsui et al. ................ 354/298 |
| 4,564,280 A | 1/1986 | Fukuda ........................ 354/317 |
| 4,594,598 A | 6/1986 | Iwagami ...................... 346/140 |
| 4,621,037 A | 11/1986 | Kanda et al. ................. 430/30 |
| 4,623,236 A | 11/1986 | Stella ........................... 354/318 |
| 4,633,300 A | 12/1986 | Sakai ............................ 358/41 |
| 4,636,808 A | 1/1987 | Herron ......................... 346/75 |
| 4,666,307 A | 5/1987 | Matsumoto et al. ......... 356/404 |
| 4,670,779 A | 6/1987 | Nagano ........................ 358/75 |
| 4,736,221 A | 4/1988 | Shidara ........................ 354/317 |
| 4,741,621 A | 5/1988 | Taft et al. ..................... 356/376 |
| 4,745,040 A | 5/1988 | Levine ......................... 430/21 |
| 4,755,844 A | 7/1988 | Tsuchiya et al. ............. 354/317 |
| 4,777,102 A | 10/1988 | Levine ......................... 430/21 |
| 4,796,061 A | 1/1989 | Ikeda et al. ................... 355/73 |
| 4,814,630 A | 3/1989 | Lim .............................. 250/578 |
| 4,821,114 A | 4/1989 | Gebhardt ...................... 358/75 |
| 4,845,551 A | 7/1989 | Matsumoto ................... 358/80 |
| 4,851,311 A | 7/1989 | Millis et al. .................. 430/30 |
| 4,857,430 A | 8/1989 | Millis et al. .................. 430/30 |
| 4,875,067 A | 10/1989 | Kanzaki et al. .............. 354/325 |
| 4,969,045 A | 11/1990 | Haruki et al. ................ 358/228 |
| 4,994,918 A | 2/1991 | Lingemann .................. 358/214 |
| 5,027,146 A | 6/1991 | Manico et al. ............... 354/299 |
| 5,034,767 A | 7/1991 | Netz et al. .................... 354/317 |
| 5,101,286 A | 3/1992 | Patton .......................... 358/487 |
| 5,124,216 A | 6/1992 | Giapis et al. ................. 430/30 |
| 5,155,596 A | 10/1992 | Kurtz et al. .................. 358/214 |
| 5,196,285 A | 3/1993 | Thomson ..................... 430/30 |
| 5,200,817 A | 4/1993 | Birnbaum .................... 358/80 |
| 5,212,512 A | 5/1993 | Shiota .......................... 354/319 |
| 5,231,439 A | 7/1993 | Takahashi et al. ........... 354/313 |
| 5,235,352 A | 8/1993 | Pies et al. .................... 346/140 |
| 5,255,408 A | 10/1993 | Blackman .................... 15/308 |
| 5,266,805 A | 11/1993 | Edgar ........................... 250/330 |
| 5,267,030 A | 11/1993 | Giorgianni et al. .......... 358/527 |
| 5,292,605 A | 3/1994 | Thomson ..................... 430/30 |
| 5,296,923 A | 3/1994 | Hung ........................... 358/527 |
| 5,334,247 A | 8/1994 | Columbus et al. ........... 118/411 |
| 5,350,651 A | 9/1994 | Evans et al. .................. 430/21 |
| 5,350,664 A | 9/1994 | Simons ........................ 430/362 |
| 5,357,307 A | 10/1994 | Glanville et al. ............ 354/324 |
| 5,360,701 A | 11/1994 | Elton et al. .................. 430/501 |
| 5,371,542 A | 12/1994 | Pauli et al. ................... 348/262 |
| 5,391,443 A | 2/1995 | Simons et al. ............... 430/21 |
| 5,414,779 A | 5/1995 | Mitch .......................... 382/199 |
| 5,416,550 A | 5/1995 | Skye et al. ................... 354/298 |
| 5,418,119 A | 5/1995 | Simons ........................ 430/507 |
| 5,418,597 A | 5/1995 | Lahcanski et al. ........... 355/76 |
| 5,432,579 A | 7/1995 | Tokuda ........................ 354/293 |
| 5,436,738 A | 7/1995 | Manico ........................ 358/503 |
| 5,440,365 A | 8/1995 | Gates et al. .................. 354/298 |
| 5,447,811 A | 9/1995 | Buhr et al. ................... 430/20 |
| 5,448,380 A | 9/1995 | Park ............................. 358/520 |
| 5,452,018 A | 9/1995 | Capitant et al. ............. 348/651 |
| 5,465,155 A | 11/1995 | Edgar .......................... 358/500 |
| 5,477,345 A | 12/1995 | Tse .............................. 358/500 |
| 5,496,669 A | 3/1996 | Pforr et al. ................... 430/22 |
| 5,516,608 A | 5/1996 | Hobbs et al. ................. 430/30 |
| 5,519,510 A | 5/1996 | Edgar .......................... 358/471 |
| 5,546,477 A | 8/1996 | Knowles et al. ............. 382/242 |
| 5,550,566 A | 8/1996 | Hodgson et al. ............ 345/202 |
| 5,552,904 A | 9/1996 | Ryoo et al. .................. 358/518 |
| 5,563,717 A | 10/1996 | Koeng et al. ................ 358/406 |
| 5,568,270 A | 10/1996 | Endo ........................... 358/298 |
| 5,576,836 A | 11/1996 | Sano et al. ................... 358/302 |
| 5,581,376 A | 12/1996 | Harrington .................. 358/518 |
| 5,587,752 A | 12/1996 | Petruchik .................... 396/315 |
| 5,596,415 A | 1/1997 | Cosgrove et al. ........... 358/296 |
| 5,627,016 A | 5/1997 | Manico ........................ 430/434 |
| 5,649,260 A | 7/1997 | Wheeler et al. ............. 396/569 |
| 5,664,253 A | 9/1997 | Meyers ........................ 396/603 |
| 5,664,255 A | 9/1997 | Wen ............................. 396/627 |
| 5,667,944 A | 9/1997 | Reem et al. .................. 430/359 |
| 5,678,116 A | 10/1997 | Sugimoto et al. ........... 396/611 |
| 5,691,118 A | 11/1997 | Haye ........................... 430/357 |
| 5,695,914 A | 12/1997 | Simon et al. ................ 430/379 |
| 5,698,382 A | 12/1997 | Nakahanada et al. ....... 430/418 |
| 5,726,773 A | 3/1998 | Mehlo et al. ................ 358/474 |
| 5,739,897 A | 4/1998 | Frick et al. .................. 355/40 |
| 5,771,107 A | 6/1998 | Fujimoto et al. ............ 358/464 |
| 5,790,277 A | 8/1998 | Edgar .......................... 358/487 |
| 5,835,795 A | 11/1998 | Craig et al. .................. 396/6 |
| 5,835,811 A | 11/1998 | Tsumura ...................... 396/598 |
| 5,870,172 A | 2/1999 | Blume ......................... 355/27 |
| 5,880,819 A | 3/1999 | Tanaka et al. ............... 355/75 |
| 5,892,595 A | 4/1999 | Yamakawa et al. ......... 358/530 |
| 5,930,388 A | 7/1999 | Murakami et al. .......... 382/167 |
| 5,959,720 A | 9/1999 | Kwon et al. ................. 355/38 |
| 5,963,662 A | 10/1999 | Vachtsevanos et al. ..... 382/150 |
| 5,966,465 A | 10/1999 | Keith et al. .................. 382/232 |
| 5,979,011 A | 11/1999 | Miyawaki et al. .......... 15/308 |
| 5,982,936 A | 11/1999 | Tucker et al. ............... 382/233 |
| 5,982,937 A | 11/1999 | Accad .......................... 382/239 |
| 5,982,941 A | 11/1999 | Loveridge et al. .......... 382/260 |
| 5,982,951 A | 11/1999 | Katayama et al. .......... 382/284 |
| 5,988,896 A | 11/1999 | Edgar .......................... 396/604 |
| 5,991,444 A | 11/1999 | Burt et al. ................... 382/232 |
| 5,998,109 A | 12/1999 | Hirabayashi ................ 430/434 |
| 6,000,284 A | 12/1999 | Shin et al. ................... 73/150 |
| 6,005,987 A | 12/1999 | Nakamura et al. .......... 382/294 |
| 6,065,824 A | 5/2000 | Bullock et al. .............. 347/19 |
| 6,069,714 A | 5/2000 | Edgar .......................... 358/487 |
| 6,088,084 A | 7/2000 | Nishio ......................... 355/75 |
| 6,089,687 A | 7/2000 | Helterline ................... 347/7 |
| 6,101,273 A | 8/2000 | Matama ....................... 382/169 |
| 6,102,508 A | 8/2000 | Cowger ....................... 347/7 |
| 6,137,965 A | 10/2000 | Burgeios et al. ............ 396/626 |
| 6,200,738 B1 | 3/2001 | Takano et al. ............... 430/362 |
| 6,943,920 B2 * | 9/2005 | Edgar .......................... 358/3.26 |

FOREIGN PATENT DOCUMENTS

| | | |
|---|---|---|
| EP | 0 422 220 A1 | 3/1989 |
| EP | 0 482 790 B1 | 9/1991 |
| EP | 0 525 886 A3 | 7/1992 |
| EP | 0 580 293 A1 | 6/1993 |
| EP | 0 580 293 A1 | 1/1994 |
| EP | 0 601 364 A1 | 6/1994 |
| EP | 0 669 753 A2 | 2/1995 |
| EP | 0 794 454 A2 | 2/1997 |
| EP | 0 768 571 A2 | 4/1997 |
| EP | 0 806 861 A1 | 11/1997 |
| EP | 0 878 777 A2 | 11/1998 |
| EP | 0 930 0498 A2 | 12/1998 |

| | | |
|----|----------------|--------|
| WO | WO90/01240     | 2/1990 |
| WO | WO91/09493     | 6/1991 |
| WO | WO97/25652     | 7/1997 |
| WO | WO98/19216     | 5/1998 |
| WO | WO 98/25399    | 6/1998 |
| WO | WO98/25399     | 6/1998 |
| WO | WO98/31142     | 7/1998 |
| WO | WO93/34157     | 8/1998 |
| WO | WO98/34157     | 8/1998 |
| WO | WO98/34397     | 8/1998 |
| WO | WO99/43148     | 8/1999 |
| WO | WO99/43149     | 8/1999 |
| WO | WO 01/01197    | 1/2001 |
| WO | WO 01/13174 A1 | 2/2001 |
| WO | WO 01/45042 A1 | 6/2001 |
| WO | WO 01/50192 A1 | 7/2001 |
| WO | WO 01/50193 A1 | 7/2001 |
| WO | WO 01/50194 A1 | 7/2001 |
| WO | WO 01/50197 A1 | 7/2001 |
| WO | WO 01/52556 A2 | 7/2001 |
| WO | 01/57796       | 8/2001 |

OTHER PUBLICATIONS

"*Anisotropic Spectral Magnitude Estimation Filters for Noise Reduction and Image Enhancement*", Aich, T., et al., Philips GmbH Research Laboratories, IEEE, pp. 335-338, 1996.

"*Adaptive-neighborhood filtering of images corrupted by signal-dependent noise*", Rangayyan, R., et al., Applied Optics, vol. 37, No. 20, pp. 4477-4487, Jul. 10, 1998.

"*Parallel Production of Oligonucleotide Arrays Using Membranes and Reagent Jet Printing*", Stimpson, D., et al., Research Reports, BioTechniques, vol. 25, No. 5, pp. 886-890, 1998.

"*Low-Cost Display Assembly and Interconnect Using Ink-Jet Printing Technology*", Hayes, D. et al., Display Works '99, MicroFab Technologies, Inc., pp. 1-4, 1999.

"*Ink-Jet Based Fluid Microdispensing in Biochemical Applications*", Wallace, D., MicroFab Technologies, Inc., Laboratory Automation News, vol. 1, No. 5, pp. 6-9, Nov., 1996.

"*Protorealistic Ink-Jet Printing Through Dynamic Spot Size Control*", Wallace, D., Journal of Imaging Science and Technology, vol. 40, No. 5, pp. 390-395, Sep./Oct. 1996.

"*A Method of Characteristics Model of a Drop-on-Demand Ink-Jet Device Using an Integral Method Drop Formation Model*", Wallace, D., MicroFab Technologies, Inc., The American Society of Mechanical Engineers, Winter Annual Meeting, pp. 1-9, Dec. 10-15, 1989.

"*Digital Imaging Equipment White Papers*", Putting Damaged Film on ICE, www.nikonusa.com/reference/whitepapers/imaging, Nikon Corporation, Nov. 28, 2000.

Zong et al., "De-Noising and Contrast Enhancement Via Wavelet Shrinkage and Nonlinear Adaptive Gain", Apr. 8, 1996, vol. 2762, pp. 566-574, ISSN: 0277-786X.

Chen et al. "Adaptive Feature Enhancement For Mammographic Images with Wavelet Multiresolution Analysis", Journal of Electronic Imaging, SPIE+IS&T, Oct. 1, 1997, pp. 467-478, ISS: 1017-9909.

\* cited by examiner

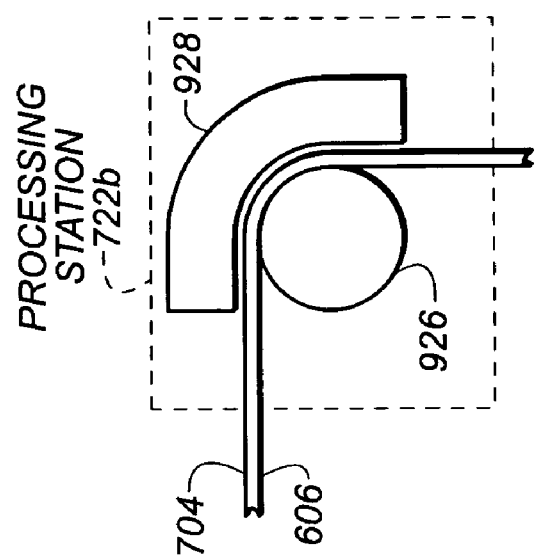
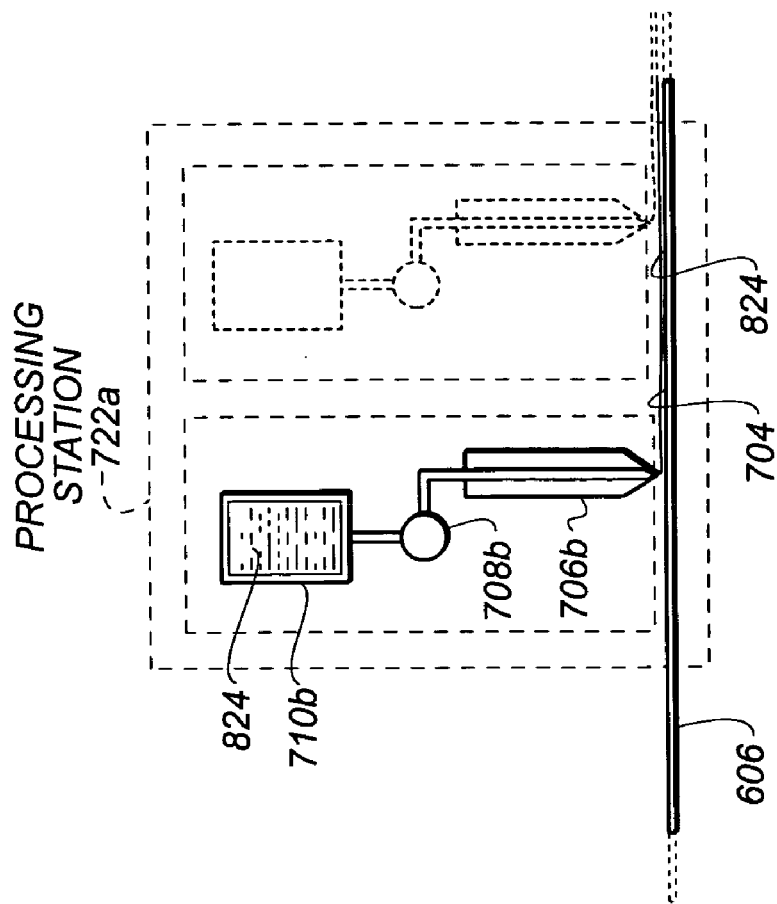

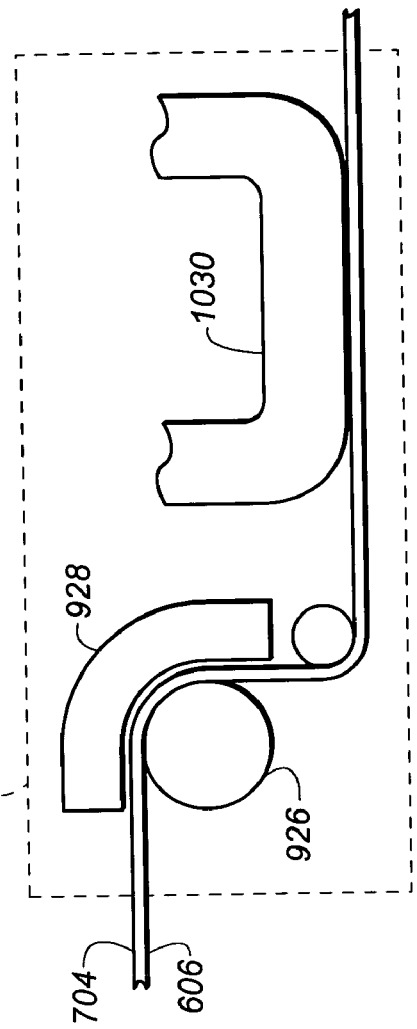
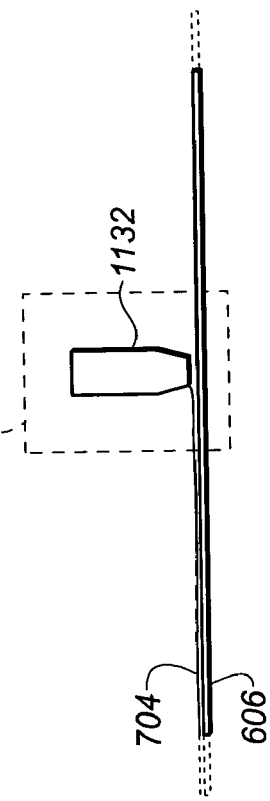

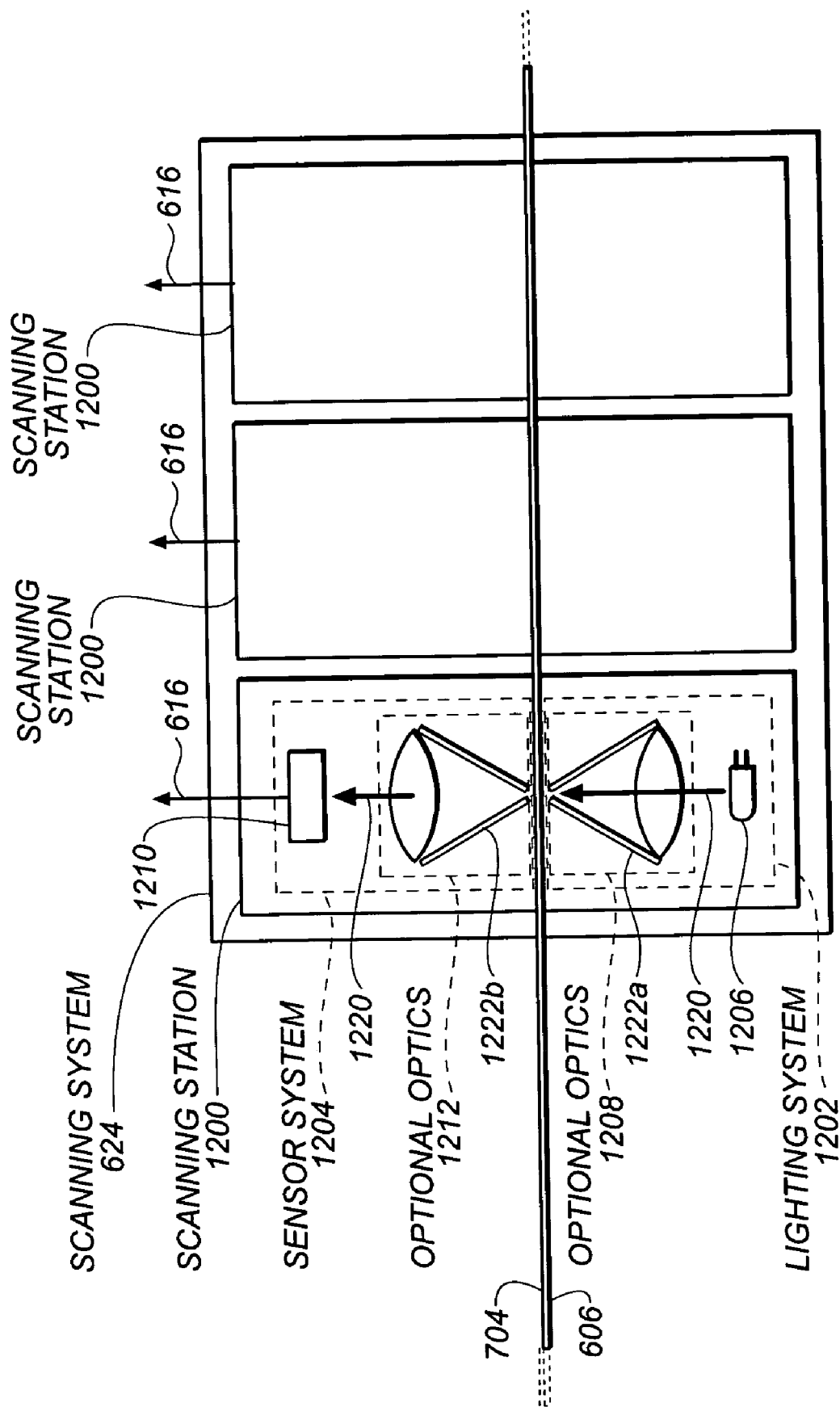

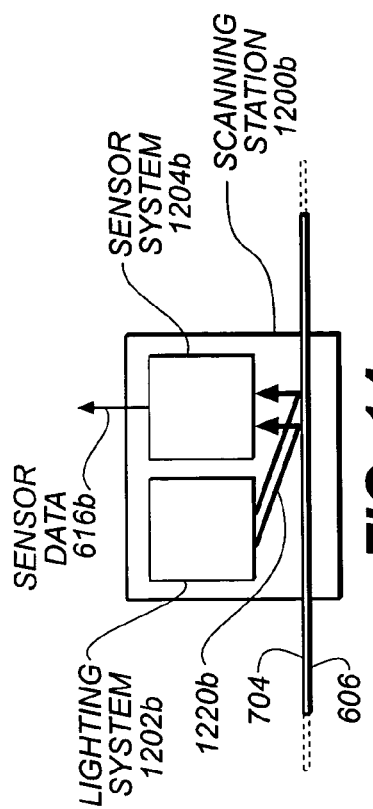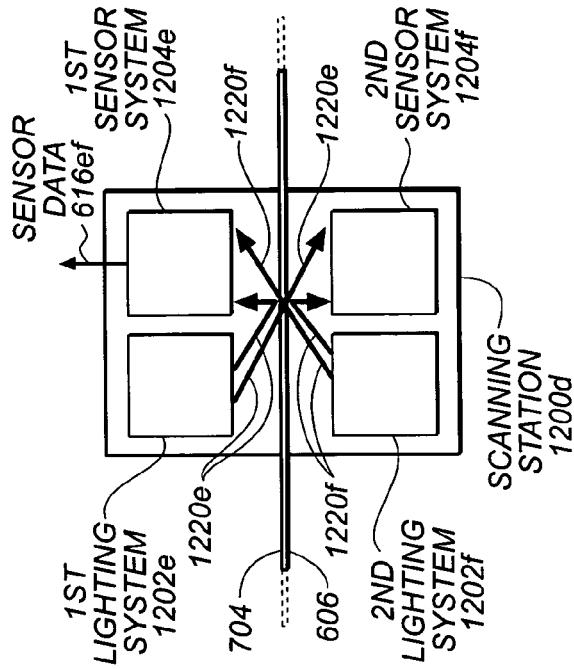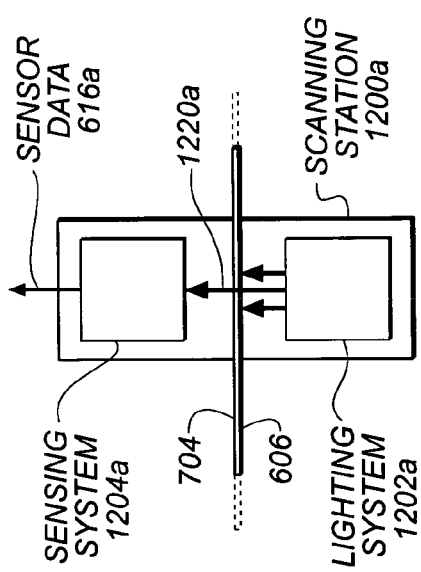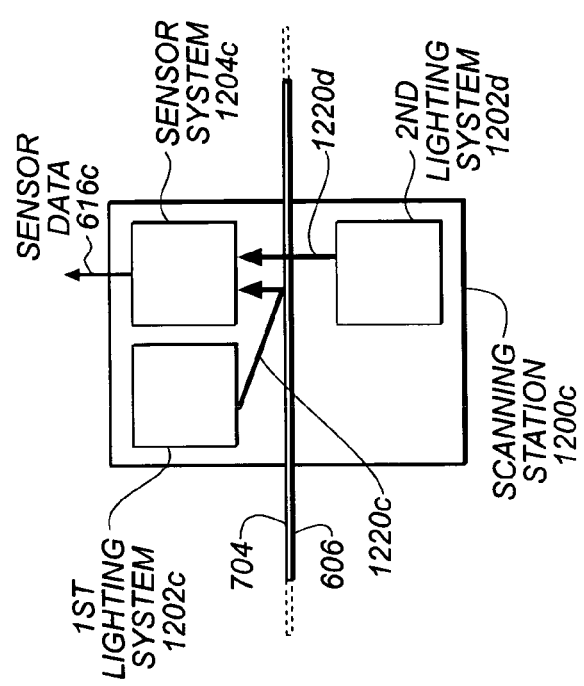

METHOD, SYSTEM, AND SOFTWARE FOR IMPROVING SIGNAL QUALITY USING PYRAMIDAL DECOMPOSITION

CROSS REFERENCE TO RELATED APPLICATIONS

This application is related to U.S. Nonprovisional patent application Ser. No. 09/775,688, entitled "Match Blur System and Method," filed Feb. 2, 2001 and this application claims benefit under 35 U.S.C. §119 of U.S. Provisional Patent application Ser. No. 60/348,821, entitled "Method, System, And Software For Improving Signal Quality Using Pyramidal Decomposition," filed Jan. 14, 2002.

FIELD OF THE INVENTION

The present invention relates generally to signal processing and more particularly to using pyramidal decomposition.

BACKGROUND OF THE INVENTION

A frequent goal of signal processing is to improve the quality, or the fidelity, of a captured signal to the information it represents by reducing noise in the signal. For example, recorded audio signals are often processed to remove noise and other undesirable signal components to create an audio signal much more similar to the original sound that was recorded. However, conventional methods used to reduce noise are sometimes ineffective or slow. In some methods, the level of noise reduction is unsatisfactory. In other methods, the reduction of noise is destructive and removes a significant amount of desired information from the signal. In addition, many of these methods require an excessive amount of processing time to perform, tying up processing resources.

These conventional noise filtering methods are often utilized in digital imaging applications, such as photographic film digitization, to reduce noise caused by film grain or noise introduced by the image capturing equipment. Many conventional noise filtering methods for images utilize blurring of the base image to reduce noise. However, the use of blurring on the base image often causes a degradation of detail, as the edges are blurred. To prevent a significant loss of detail, conventional image noise reduction methods reduce the level of noise reduction, thereby diminishing the effectiveness of the blurring process. The conventional blurring methods can also require relatively extensive processing as the base image is processed at the base resolution.

Given the drawbacks in current noise reduction methods, it is clear that conventional methods of improving signal quality are less than perfect.

SUMMARY OF THE INVENTION

Therefore, what is needed is a method for improved noise reduction. Accordingly, the present invention provides a method comprising obtaining a base signal including a plurality of signal components and performing a higher level pyramidal decomposition of the base signal to generate a higher level decomposed signal. The method further comprising performing a lower level pyramidal decomposition of the first decomposed signal to generate a lower level decomposed signal. The ratio of a desired signal component to other signal components of the higher level decomposed signal is increased to generate a first modified signal. The method further comprising increasing, using the first modified signal, a ratio of a desired signal component to other signal components of the base signal to generate an improved base signal.

Another embodiment of the present invention provides for a method comprising obtaining a base image including a plurality of image components and performing a higher level pyramidal decomposition of the base image to generate a first decomposed image. A second decomposed image is generated by performing a lower level pyramidal decomposition of the first decomposed image. The method further comprising increasing, using the second decomposed image, the signal-to-noise ratio of the first decomposed image to generate a first modified image. An improved base image is generated by increasing, using the first modified image, the signal-to-noise ratio of the base image.

In another embodiment of the present invention, a digital film development system is provided. The digital film development system comprises a film processing system and a data processing system. The film processing system includes an image capturing station capable of obtaining sets of data representing an image formed in film. The data processing system includes: a processor; memory; and a program of instructions capable of being stored in the memory and executed by the processor. The program of instructions includes instructions to manipulate a processor to obtain a base image including a plurality of image components and perform a higher level pyramidal decomposition of the base image to generate a first decomposed image. The program of instructions further includes instructions to manipulate a processor to generate a second decomposed image by performing a lower level pyramidal decomposition of the first decomposed image and to increase, using the second decomposed image, the signal-to-noise ratio of the first decomposed image to generate a first modified image. The program of instructions further includes instructions to manipulate a processor to generate an improved base image by increasing, using the first modified image, the signal-to-noise ratio of the base image.

In another embodiment of the present invention, a digital image tangibly embodied in a computer readable medium is provided. The digital image is generated according to a method comprising obtaining a base image including a plurality of image components and performing a higher level pyramidal decomposition of the base image to generate a first decomposed image. A second decomposed image is generated by performing a lower level pyramidal decomposition of the first decomposed image. The method further comprising increasing, using the second decomposed image, the signal-to-noise ratio of the first decomposed image to generate a first modified image. An improved base image is generated by increasing, using the first modified image, the signal-to-noise ratio of the base image.

Another embodiment of the present invention provides a computer readable medium tangibly embodying a program of instructions. The program of instructions includes instructions to manipulate a processor to obtain a base signal including a plurality of signal components and to perform a higher level pyramidal decomposition of the base signal to generate a higher level decomposed signal. The program of instructions further includes instructions to manipulate a processor to perform a lower level pyramidal decomposition of the first decomposed signal to generate a lower level decomposed signal and to generate a first modified signal by increasing the ratio of a desired signal component to other signal components of the higher level. The program of instructions further includes instructions to manipulate a processor to increase, using the first modified signal, a ratio of a desired signal component to other signal components of the base signal to generate an improved base signal.

An advantage of at least one embodiment of the present invention is that unwanted noise in a signal may be significantly reduced without significantly reducing the desired portion of the signal.

An additional advantage of at least one embodiment of the present invention is that signal quality may be improved for a desired signal component without degrading any other desired signal components.

Yet another advantage of at least one embodiment of the present invention is that calculations to improve signal quality can be performed relatively quickly, due to a lower processing overhead and less user intervention than conventional methods.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

FIG. 8 is a block diagram illustrating another embodiment of the development system, as shown in FIG. 6, according to at least one embodiment of the present invention;

FIGS. 9 through 11 are block diagrams illustrating various embodiments of a processing station, as shown in FIG. 8, according to at least one embodiment of the present invention;

FIG. 12 is a block diagram illustrating a scanning system, as shown in FIG. 6, according to at least one embodiment of the present invention; and FIGS. 13 through 16 are block diagrams illustrating various embodiments of a scanning station, as shown in FIG. 12, according to at least one embodiment of the present invention.

DETAILED DESCRIPTION OF AN EMBODIMENT OF THE INVENTION

FIGS. 1–16 illustrate a method, system, and software for pyramidal decomposition of a base signal to improve one or more signal components or characteristics of the base signal. The base signal, at the highest level of the pyramidal decomposition processes (or level 0), is decomposed, generating a first decomposed signal of a lesser resolution at a next lower level, or the first level. The decomposed signal of the first level is decomposed again, generating a second decomposed signal of a lesser resolution at a next lower level, or level 2. This pyramidal decomposition process is repeated until a desired number of levels of decomposition have been performed.

The decomposed signal of the lowest level is preprocessed to generate a preprocessed signal. This preprocessed signal can include a filter mask, an up-predicted signal, where an up-predicted signal can include a prediction of composition of the decomposed signal of a lower level at the resolution of a next higher level, and the like.

The preprocessed signal from the lowest level is used to generate a modified signal on the next higher level. In one embodiment, a filter mask (the preprocessed signal) from the lowest level is used to guide the filtering of the decomposed image of the next higher level. In another embodiment, an up-predicted signal is compared or combined with the decomposed image of the next higher level to generate a modified signal at that level. As a result of the filtering and/or up-prediction, the modified signal has improved signal characteristics, such as a signal-to-noise ratio, over the decomposed signal of the same level.

This process of generating a preprocessed signal at a lower level and then using the preprocessed signal at a higher level to generated a modified signal at the higher level is repeated until a preprocessed signal from the second highest level is used to generate an improved base signal at the highest level (level 0). As a result of the recursive pyramidal decomposition, modification, combination, and recomposition at each level, an improved base signal having improved quality results at level 0. In at least one embodiment, the pyramidal decomposition method, as described above, is applied to only one level of decomposition.

Figure 1:
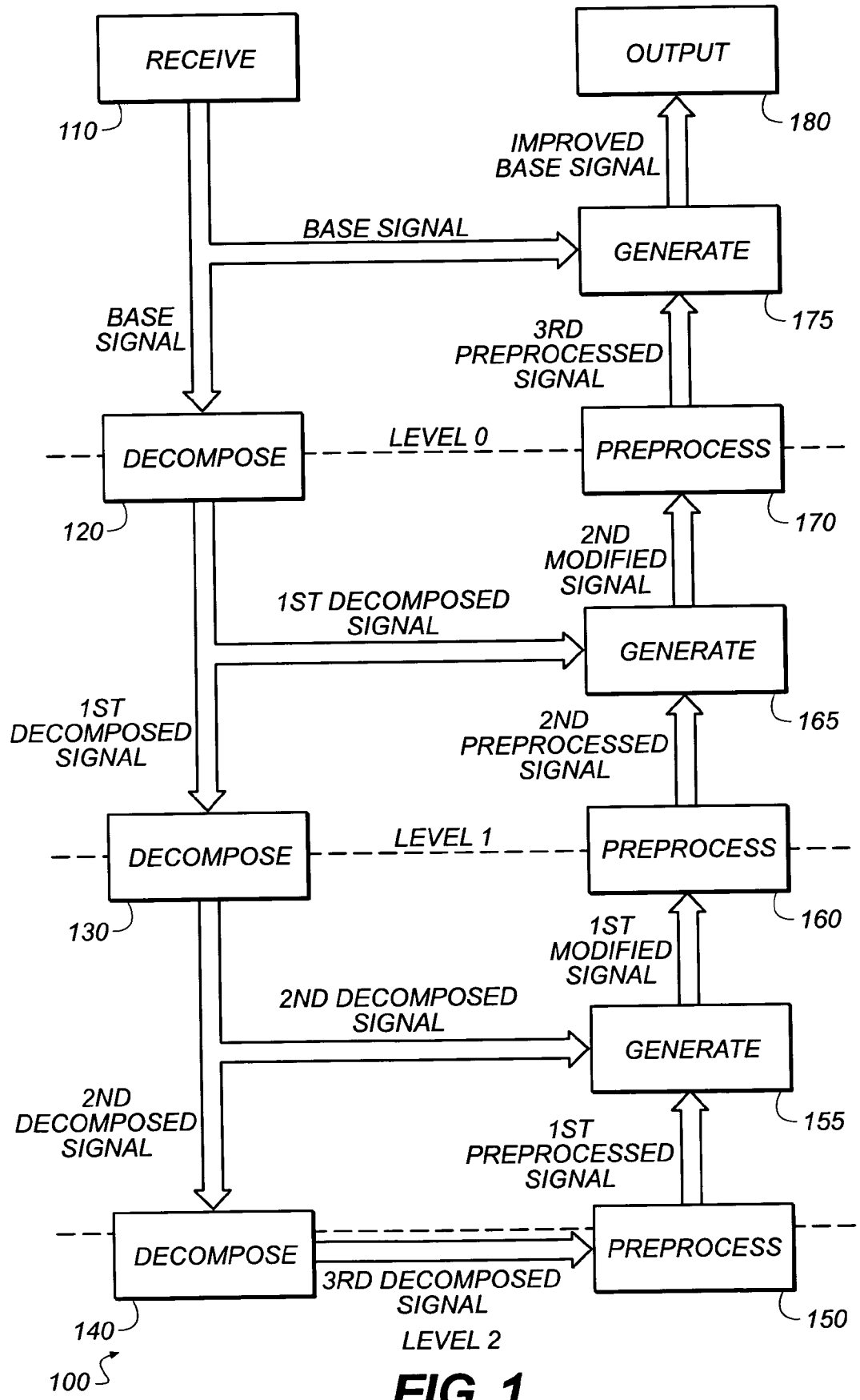
FIG. 1 is a flow diagram illustrating a method for signal improvement using pyramidal decomposition according to at least one embodiment of the present invention.

Referring now to FIG. 1, a method for using a signal from a lower level of a pyramidal decomposition to improve a signal from a higher level of the pyramidal decomposition is illustrated according to at least one embodiment of the present invention, and referred to herein generally as decompose method 100. Decomposition method 100 commences with step 110, wherein a base signal is received for processing according to decomposition method 100. The term "signal," as used herein, can refer to a captured or recorded representation of an environmental phenomenon, such as one or more images captured on film or by digital camera, a recorded audio signal recorded on magnetic media, a electrical analog signal transmitted over a wire, and the like. For example, an image of an object could be captured in photographic film. The photographic film could then be developed using a digital film processing system and converted to one or more digital data sets representative of the image captured in the photographic film. The step of receiving or obtaining the base signal is considered to be the highest level, or level 0, of a pyramidal decomposition as described in the following steps.

In at least one embodiment, the base signal is an analog signal and conversion of the base analog signal includes digitizing the signal into one or more digital data sets representative of the base image. For example, a sound wave is captured by a microphone and converted to an electrical analog signal (the base signal). The microphone is connected to a analog-to-digital (A/D) converter, which converts the analog signal to a digital signal. The digital signal is then saved as a digital data set or file on a storage medium by a data processor. In another example, an image may be recorded on photographic film. In this case, the step of conversion can include placing the film in a film scanner or digital film development system and scanning the film to produce one or more digital data sets representing one or more layers of the film.

In other embodiments, the base signal has already been digitized, such as an image stored on a digital camera. In this embodiment, step 110 can include the steps of receiving the digital data representing the signal and/or storing the digital data to a storage medium, such as a hard disk or memory, where it may be accessed later. Step 110 can also include the step of converting the digital data from one form to another appropriate form, such as converting a bitmap image file to a Joint Photographic Experts Group (JPEG) image file. It will be appreciated that other methods of obtaining and preparing a base signal for processing, either by a digital or analog system, may be used without departing from the spirit or the scope of the present invention.

Capturing and processing of signals often results in unwanted information manifesting itself in the captured signal. For example, "noise", in a variety of forms, often appears in captured signals and their digital representations. Noise can often refer to a disturbance that obscures or reduces the clarity of a signal, such as white noise introduced by transmission of a signal. Noise, as used herein, can also refer to any extraneous signal components, or signal components other than one or more desired components, that may interfere with the capture, processing, and or representation of the one or more desired components. For example, noise could refer to static introduced into the wireless broadcast of a television signal, or grain in photographic film caused by undeveloped metallic silver.

In step 120, the base signal is decomposed, generating a first decomposed signal at the next lower level, or level 0, of the pyramidal decomposition. A variety of decomposition methods may be utilized, such as sampling or decimation. In embodiments where the base signal includes an image and is converted to a pixel based data set, the resolution of the image may also be decomposed or reduced by discarding a certain number of pixels, such as by averaging values of neighbors using window kernel techniques. In at least one embodiment, the base signal is decomposed by a decomposition factor n, where n is a real number. It will be appreciated that the factor n could be determined by a user, by analysis of the image, by empirical determination, and the like.

In step 130, the first decomposed signal is decomposed, generating a second decomposed signal at the next lower level, or level 1, of the pyramidal decomposition. The first decomposed signal can be decomposed using the same method as in step 110, or using a different method. Similarly, in one embodiment, the same decomposition factor n is used as in step 120, while in another embodiment, a different decomposition factor n is used. In step 140, the second decomposed signal is decomposed, generating a third decomposed signal at the lowest level, or level 2, of the pyramidal decomposition. As discussed in step 130, the same or different methods of decomposition or decomposition factors may be used in step 140 as in step 120 and/or step 130.

In step 150, the third decomposed signal is preprocessed to produce a first preprocessed signal. In one embodiment, the third decomposed signal is preprocessed to produce a filter mask or other guiding element (the first preprocessed signal) to guide a filtering of a higher level signal. For example, a filter mask generated from a lower level signal be used to guide the direction of a filtering or blurring process on a higher level signal having more noise. The filter mask or other guiding element can also be upsampled or recomposed to a higher resolution, such as the resolution of the next higher level, as necessary. A method for filtering using a filter mask is discussed in greater detail with reference to FIG. 3.

In another embodiment, the third decomposed signal is up-predicted to generate a first preprocessed signal. The term "up-predict," as used herein, refers to the prediction of the composition of a higher level signal using a lower level signal. For example, the third decomposed signal can be up-predicted to predict what the third decomposed signal of level 2 would likely look like at a resolution of level 1 of the pyramidal decomposition. Although up-predicting can include just recomposing or upsampling the lower level signal, in at least one embodiment, the lower level signal may contain unwanted or erroneous signal components, such as noise. In this embodiment, an algorithm may be applied to the lower level signal to predict the composition of a higher level signal without noise or other unwanted signal components present. For example, noise in an image as a result of grain in the film from which the image was captured may be present in a decomposed image. An up-prediction algorithm could detect the noise and not propagate the noise to the up-predicted signal of the next higher level. When the base signal includes an image, up-prediction is especially useful on predicting image detail, such as edges in a higher level image. Step 150 can further include upsampling or recomposing the up-predicted signal (the first preprocessed signal) to a higher resolution as necessary. A method of up-prediction is discussed in greater detail herein with reference to FIG. 2. It will be appreciated that other methods to produce a first preprocessed signal, such as interpolation or upsampling the third decomposed signal, may be used without departing from the spirit or the scope of the present invention.

In step 155, a first modified signal is generated by improving the ratio of a desired signal component to other signal components (the signal-to-noise ratio) of the second decomposed signal using the first preprocessed signal. The term "signal-to-noise ratio (SNR)," as used herein, refers to the ratio of the amount of information associated with one or more desired signal components to the sum amount of information associated with one or more extraneous or undesired signal components. The SNR of a signal can be determined using a variety of techniques, such as a subjective determination by a user, measurement using electronic equipment, application of a mathematical algorithm to the digital data representative of a signal, and the like. For example, if the signal to noise ratio for an image captured on photographic film is desired, another image whose properties are known may be captured on another part of the photographic film. In this case, a part of the photographic film could be exposed to a large quantity of white light, effectively causing that part of the film to be an all-white image. Since the part of the photographic film was completely exposed, and should therefore theoretically be all white, any non-white pixels or areas of the film can be considered noise introduced by the film itself (grain) or the image capturing and processing system. The total signal measurement can then be compared to the noise measurement to determine a representative SNR. Although the computed SNR applies to a different section of film, it can be assumed that the distribution of grain in photographic film is relatively uniform throughout a photographic film and that the noise introduced by the image capturing and processing system is relatively constant. With these justified assumptions, the SNR of the white image can be applied to other images recorded on the photographic film and captured by the image capturing and processing system under the same conditions.

The recursive decomposition of the base signal in steps 120–140 results in decomposed signals with different levels of resolution. As a result of the reduction of resolution at each successive layer, the decomposed signal of a lower level, in many cases, has overall decreased signal information, but the SNR is increased. For example, the reduction of the resolution of an image (the base signal) results in an overall decrease in image information. Since decomposing an image often involves averaging neighboring pixels, or even discarding a certain number of pixels outright, noise is often averaged out or eliminated through the discarding of pixels. Although desired image information, such as detail, is reduced in the same manner, noise, such as Gaussian noise, is reduced at a greater rate than the desired image information is reduced. As a result, the overall SNR of the lower level decomposed image is greater than the next higher level image. Therefore, a lower level signal having a lower SNR can be used to improve the SNR of a higher level signal, while keeping the information of the higher level signal.

In one embodiment, a first modified signal is generated by filtering the second decomposed signal using a filter mask (from step 150) as a guide. Although unguided filtering is often used to reduce the noise of a signal, there is often a correlated reduction in the fidelity (or detail) of the filtered signal, therefore causing the SNR of the filtered signal to remain constant or even decrease. However, in at least one embodiment, guided filtering using a filter mask or other guiding method results in a reduction of the amount of noise in the filtered signal, while the amount of the desired information in the filtered signal remains constant or decreases little in comparison to the reduction in noise. This results in a filtered signal (the first modified signal) having an improved, or increased, SNR. In at least one embodiment, the filtered signal additionally is compared or combined with the second decomposed signal to generate the first modified signal. Methods for comparing and/or combining signal are discussed in greater detail subsequently. It will be appreciated that an unguided filtering process may be used to generate a first modified signal in instances where the signal to be filtered has certain properties that allow an unguided filtering process to improve the SNR. Guided filtering is discussed in greater detail with reference to FIG. 3.

In another embodiment, a first modified signal is generated by comparing and/or combining an up-predicted signal (the first preprocessed signal) with the second decomposed signal. Since the up-predicted signal, in one embodiment, represents a prediction of the composition of a third decomposed signal with a decreased amount of noise (or no noise) at a higher resolution, such as the resolution of level 1, the up-predicted signal can be compared with the second decomposed signal to determine which components of the second decomposed signal are desired components and which are undesired or erroneous components. The erroneous or undesired signal components can then be omitted from, or replaced in, the first modified signal. Methods for combining a signal and its corresponding up-predicted signal are discussed in greater detail with reference to FIG. 4. It will be appreciated that other methods may be used to improve the SNR of a signal, such as scratch detection and removal methods for images, or that a plurality of SNR improvement methods may be used in step 155 without departing from the spirit or the scope of the present invention.

In step 160, a second preprocessed signal is generated at level 1 from the first modified signal. As in step 150, the second preprocessed signal can include a filter mask, an up-predicted signal, and the like. In step 165, a second modified signal is generated from the second preprocessed signal. As in step 155, a filter mask (the second preprocessed signal) may be used to guide a filtering process on the first decomposed signal, or an up-predicted signal (the second preprocessed signal) may be combined with the first decomposed signal.

In step 170, a third preprocessed signal is generated at level 0 from the second modified signal. As in step 150, the third preprocessed signal can include a filter mask, an up-predicted signal, and the like. In step 175, an improved base signal is generated from the third preprocessed signal. As in step 155, a filter mask (the third preprocessed signal) may be used to guide a filtering process on the base signal, or an up-predicted signal (the third preprocessed signal) may be combined with the base signal. In at least one embodiment, the resulting improved base signal has an improved SNR due to the use of the recursive use of a lower level signal having improved SNR to improve the SNR of a higher level signal. In step 180, the improved base signal is stored and/or output. For example, the improved base signal could be stored on a storage device for later use, printed using a printer, output to another system for further processing, and the like.

Although decomposition method 100 was illustrated using two levels of decomposition (levels 1 and 2), in at least one embodiment, fewer or more levels of decomposition may be used as appropriate. For example, only one level of decomposition may be used, wherein the first decomposed signal is used to create a preprocessed signal, which in turn is used to generate an improved base signal, as previously discussed. Alternately, more than two levels also may be used. In this case, the base signal is recursively decomposed for the desired number of levels. At the lowest, or bottom, level, the decomposed signal is used to generate a preprocessed signal. This preprocessed signal is used to generate a modified signal. The modified signal, in turn, is used at the next higher level to generate another preprocessed signal, and so on. Each given level uses the modified signal from the lower level to generate a modified signal from the given level, as discussed previously. As a result, an improved base image having an improved SNR is generated by the recursive improvement of the SNR of the modified signal from the lower level.

In at least one embodiment, decomposition method 100 is implemented on a data processor or digital film development system. In this case, decomposition method 100 could be implemented as a program of instructions, where the program of instructions process a data set representing a signal as described previously. The program of instructions could be stored in memory and retrieved from memory by a processor for execution of the program of instructions. In another embodiment, decomposition method 100 could be implemented in analog or digital hardware, where the analog or digital hardware is structured or adapted to perform the steps of decomposition method 100. One advantage of decomposition method 100 is that less processing time and/or effort is needed, in one embodiment, to increase the SNR of an original base signal.

In many cases, the amount of effort required to process a signal is not linearly proportional to the resolution of the signal. For example, the processing effort for some blurring, up-predicting, or other image modification methods may be proportional to the square of the resolution of the image being processed. In this case, if an image A has a resolution of 100×100 and an image B has a resolution of 200×200, there is a four-fold increase in resolution between image A and B (from 10,000 pixels in image A to 40,000 pixels in image B), and a sixteen-fold increase in the effort required to process image B over that required to process image A.

Similarly, many methods of combining signals such as images are linearly, or nearly linearly, proportional to the change in resolution. Therefore, by repeatedly decomposing a signal into signals of lesser resolution, processing the decomposed signals at a certain level with considerably less effort than would be required at the base level, and then recomposing and combining the processed signals often results in an improved base image having improved quality equivalent or better than other methods, with less processing time and/or effort required for the given result. An example of decomposition method 100 as applied to an image is subsequently illustrated with reference to FIG. 5.

Figure 2:
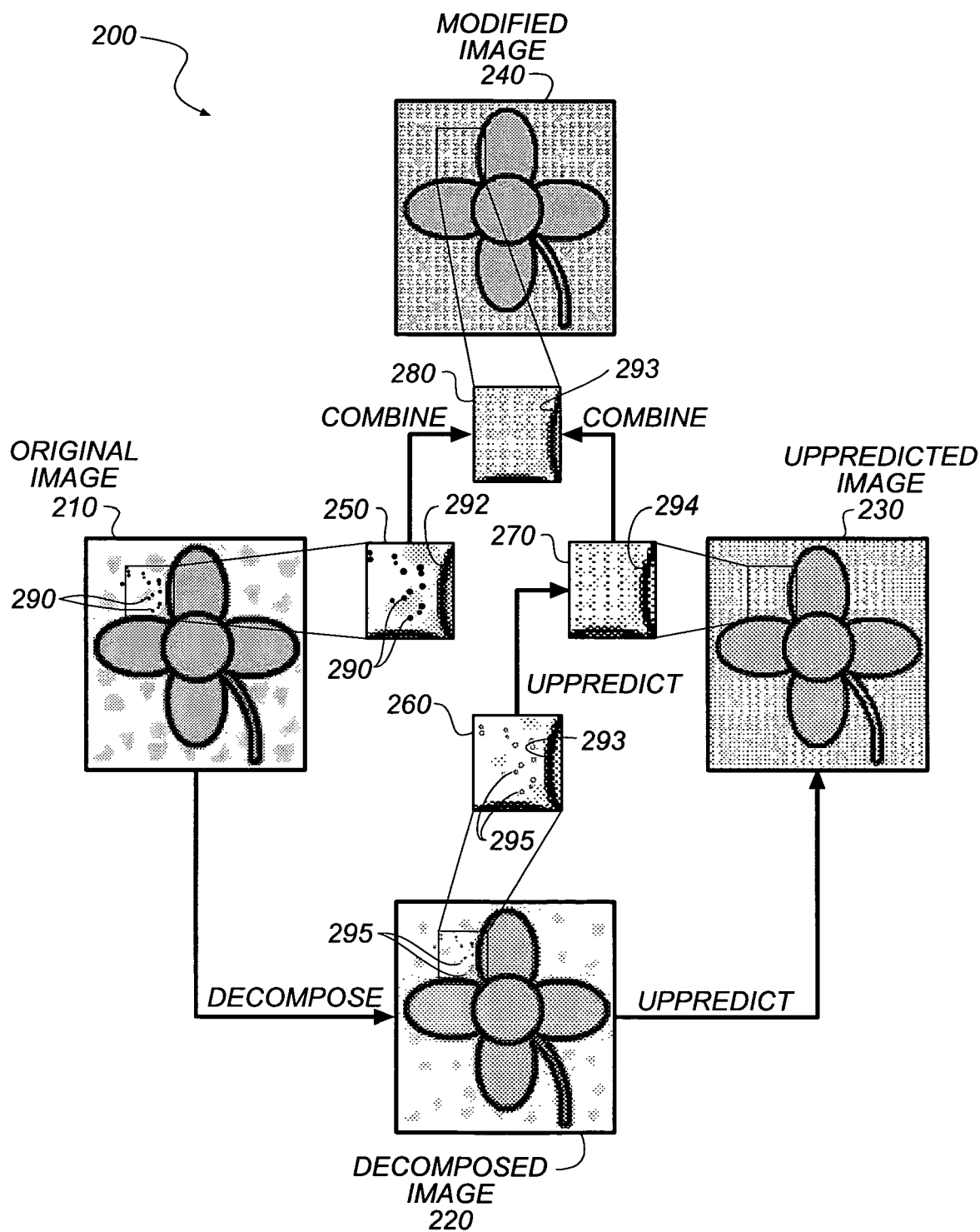
FIG. 2 is a pictorial diagram demonstrating an up-prediction method according to at least one embodiment of the present invention.

Referring next to FIG. 2, a method for up-predicting a signal is discussed according to at least one embodiment of the present invention, and is referred to herein generally as up-predict method 200. In the following discussion, up-predict method 200 is described as applied to an image (as a particular embodiment of a signal) for illustration purposes. The techniques discussed with reference to up-predict method 200 may also be applied to other signals with the appropriate modifications.

Original image 210 can include a captured base image or a decomposed image from any given level of a pyramidal decomposition, as discussed with reference to FIG. 1. Original image 210 includes, in one embodiment, noise artifacts 290 (size exaggerated for illustrative purposes). Noise artifacts 290 can include noise introduced from grain in a photographic film from which original image 210 was captured. Noise 290 can also include noise introduced by an image capturing system, noise introduced by the transmission of a data set representing original image 290, or defects in the recording medium of the image source, such as scratches, and the like. Original image window 250 represents a magnified view of a given portion of original image 210 including noise artifacts 290 and an edge (original edge 292) located in original image window 250.

Decomposed image 220 is generated by the decomposition of original image 210, as discussed with reference to steps 120–140 of FIG. 1. As discussed previously, the decomposition of original image 210 can include outright sampling or removal of a number of pixels, such as removing every other pixel of original image 210, or an averaging method, such as using a window kernel to average the pixel value of a pixel with its neighbors and then removing one or more neighbors. As a result of the decomposition, decomposed image 220 has a decreased resolution as compared to original image 210. The decreased resolution results in an overall decrease of image information in decomposed image 220. This also often results in the reduction of the information of noise artifacts 290. For example, noise artifacts 290 could be eliminated during the decomposition of original image 210. Alternately, in other decomposition methods, the noise pixels are averaged with their surrounding pixels, often resulting in a significant reduction in the amount of information correlated to noise artifacts 290. Noise artifacts 290 are represented in decomposed image 220 as decomposed noise artifacts 295. A magnified view of the corresponding magnified portion of original image 210 is designated as decomposed image window 260. Decomposed image window 260 includes decomposed noise artifacts 295 and decomposed edge 293 correlated to original edge 292.

Up-predicted image 230 is generated by up-predicting decomposed image 220. A magnified view of the corresponding magnified portion of original image 210 and decomposed image 220 is designated as up-predicted image window 270. Up-predicted image window 270 includes up-predicted edge 294, correlated to original edge 292 and decomposed edge 293. A variety of up-predicting methods may be used to generate up-predicted image 230. For example, an up-predicting algorithm could attempt to detect edges (decomposed edge 293) in decomposed image 220. These detected edges could be used to guide the prediction of the remaining components of the image, such as color information. For example, if an edge representing a circle with a few discontinuities in the edge is detected in decomposed image 210, using a Laplacian-of-Gaussian edge detection algorithm, for example. The up-predicting algorithm could predict that the discontinuities are not supposed to be there, and replace the values of the pixels representing the discontinuities with values of other pixels of the edge. The up-predicting method could then fill in the circle using an average pixel color value for the pixels located inside of the circle. In another example, an up-predicting algorithm could search for sequences of pixels having a certain pixel value whose length is below a threshold. In this case, the up-predicting algorithm could remove all such sequences of pixels, as they could be assumed to be introduced noise and not a desired image component. Other methods for up-predicting an the composition of an image of a lower resolution into an image of higher resolution may be used, such as methods incorporating basis splines, without departing from the spirit or the scope of the present invention.

In at least one embodiment, the up-prediction of decomposed image 220 results in an increase in the signal-to-noise ratio of up-predicted image 230 compared to original image 210. For example, as discussed previously, noise (noise artifacts 290) can often be eliminated or reduced by decomposition. The reduced noise (decomposed noise artifacts 295), if not totally eliminated, is, in at least one embodiment, reduced further or totally eliminated during the up-prediction process. For example, if decomposed noise artifacts 295 are below a threshold for an up-prediction method, they are not reproduced in up-predicted image 230, as shown by their absence from up-predicted window 270. However, recall that desired information may also be reduced during the up-predict process. For example, up-predicted edge 294 is thinner and less sharp than original edge 292, as illustrated in up-predicted window 270 and original window 250 respectively.

In at least one embodiment, original image 210 and up-predicted image 230 are combined to generate modified image 240. A variety of methods may be used to combine original image 210 and up-predict image 230. For example, in one embodiment, a method that averages the values of a pixel from original image 210 to the corresponding pixel value of up-predicted image 230 is used. In this example, the each pixel value is multiplied by a weighting factor determined using the SNR of original image 210. Methods for combining signals are discussed in greater detail with reference to FIG. 4.

As a result of the combination of original image 210 with up-predicted image 230, resulting modified image 240 has an improved SNR. For example, as illustrated in the magnified view (modified window 280) of the corresponding magnified portion of original image 210, decomposed image 220 and up-predicted image window 270. Modified window 280 illustrates the combination of original window 250 and up-predicted window 270. As illustrated, modified window 280 does not include remnants of noise artifacts 290, since they were eliminated in the up-prediction of decomposed image 220 and not added in when original image 210 and up-predicted image 230 were combined. Similarly, although up-predicted edge 294 is thinner than original image 292, improved edge 296 is restored to the thickness of original edge 292 as a result of the combination of original image 210 and up-predicted image 230. As a result, modified image 240 includes most or all of the desired image components of original image 210 while including few, if any, of the undesired or erroneous image components of original image 210. As previously discussed, since the quantity of desired information or quality of the desired image components in modified image 240 are approximately the same as in original image 210 while quantity of erroneous information decreased from original image 210 to modified image 240, modified image 240 could be said to have a higher SNR, and therefore is an improved image.

Figure 3:
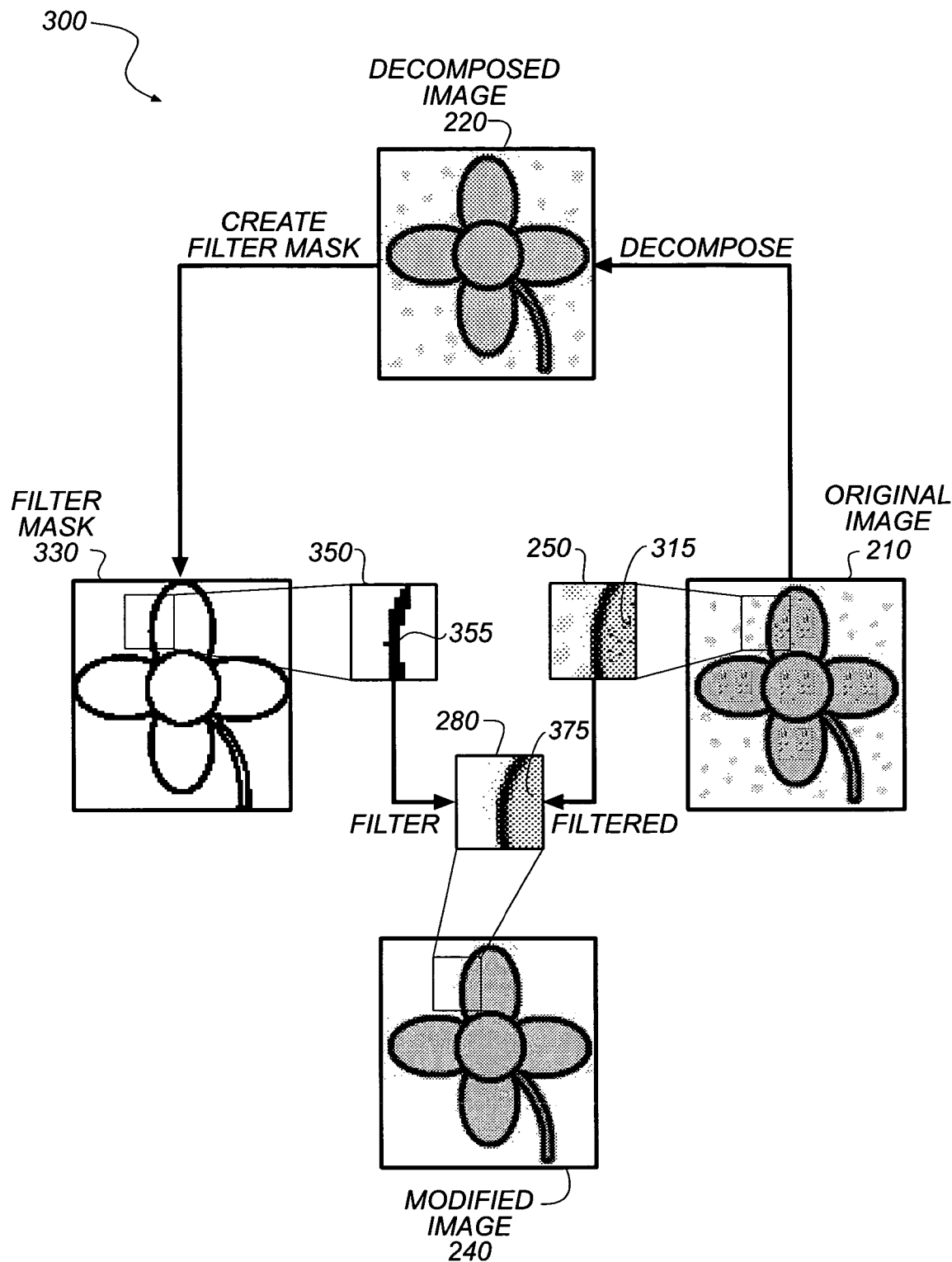
FIG. 3 is a pictorial diagram demonstrating a guided filtering method according to at least one embodiment of the present invention.

In at least one embodiment, a guided filtering method may be used in addition to, or instead of, using an up-predicted signal from a lower level to improve the SNR of a signal at a higher level. Referring to FIG. 3, a guided filtering method is illustrated according to at least one embodiment of the present invention, and is referred to herein generally as filter method 300. In the following discussion, filter method 300 is described as applied to an image (as a particular embodiment of a signal) for illustration purposes. The techniques discussed with reference to filter method 300 may also be applied to other signals with the appropriate modifications.

Original image 210 can include a captured base image or a decomposed image from any given level of a pyramidal discussion, as discussed with reference to FIG. 1. Original image window 250 represents a magnified view of a given portion of original image 210 including noisy image portion 315. Noisy image portion 315 represents a portion of an image component having noise.

Decomposed image 220 is generated by the decomposition of original image 210, as discussed previously. As a result of the decomposition, decomposed image 220 has a decreased resolution as compared to original image 210. The decreased resolution results in an overall decrease of image information in decomposed image 220. Fortunately, this also often results in the reduction of noise by eliminating a number of pixels representing noise. Alternately, in other decomposition methods, the noise pixels are averaged with their surrounding pixels, often resulting in a significant reduction in the amount of information correlated to noise.

Decomposed image 220 is used to generate filter mask 330. In one embodiment, filter mask 330 is generated by detecting high frequency image components of decomposed image 220, such as edges, or areas of rapid or marked contrast change. These high frequency image components are marked or noted in filter mask 330. For example, pixels comprising an edge in decomposed image 220 are noted by placing a black pixel in filter mask 330 in the corresponding location while other pixels not part of an edge are noted by placing a white pixel in filter mask 330 in the corresponding location, as illustrated in filter window 350. Filter window 350 represents a magnified view of a given portion of filter mask 330 corresponding to the magnified view of original image 210. Filter mask edge 355 represents the black pixels indicative of an edge in decomposed image 220. Filter mask 330 could also include a number of pixels whose values increase from black to white as their distance from a high frequency component increases. In many cases, it is preferable to create filter mask 330 from decomposed image 220 rather than original image since decomposed image 220 has, in one embodiment, a higher SNR than original image 210. Decomposed image 220, with less noise, often is less likely to produce an erroneous filter mask edge 355 due to noise than original image 210.

In embodiments where filter mask 330 represents high frequency components of decomposed image 220, filter mask 330 is used to prevent any blurring, or overblurring, of the high frequency components of 210. Using the previous example, filter mask edge 355 may be used to denote the limits of a blurring process, such as a match blur, on original image 210. The blurring process may occur on portions of original image 210 where the values of the corresponding pixels of filter mask 330 have a white value. Likewise, the blurring process is avoided on pixels of original image 210 where the values of the corresponding pixels of filter mask 330 have a black value. Additionally, the filtering process may be limited on pixels of original image 210 where the values of the corresponding pixels of filter mask have grey values, and where pixels with darker grey values are filtered less than pixels with lighter grey values.

In another embodiment, filter mask 330 is generated by determining a filtering direction for one or more pixels or subsets of pixels of decomposed image 220. For example, subsets of pixels in decomposed image 220 could be analyzed to determine the proper blur direction by moving a structuring element, such as a 3 by 3 window kernel, over the decomposed image 220 such that the structuring element is over every, or almost every, pixel in decomposed image 220 at least once. The pixels covered by the window kernel are analyzed for a dominant direction. If an appropriate blur direction is determined, the blur direction for the subset of pixels covered by the window kernel is noted in filter mask 330. As with a filter mask used with edges, decomposed image 220, often having a higher SNR, is less likely to produce a faulty blur direction filter mask due to noise than original image 210.

In embodiments where filter mask 330 represents blur directions for subsets of pixels of original image 210, filter mask 330 is used to indicate the blur direction that should be used on a given group of pixels. For example, the directional value noted in filter mask 330 could be determined for a given group of pixels in original image 210. The given group of pixels are then filtered in the indicated direction. Each group of pixels of original image 210 is blurred in the same manner. A match blur is particularly well-suited to directional blurring on images. In one embodiment, filter mask 330 is recomposed or upsampled to the same resolution as original image 210 to facilitate filtering. It will be appreciated that other filtering methods using a filter mask may be used without departing from the spirit or the scope of the present invention.

Modified image 240 is generated as a result of the guided filtering process on original image 210 using filter mask 330. Modified window 280 represents a magnified view of a portion of modified image 240 correlated to the portion of original image 210 and filter mask 330. As illustrated by noiseless image portion 375 in improved window 280, the noise in original image 210 is reduced or eliminated while the detail, such as edge information, of original image 210 is retained. This is a result of the blurring of the areas of original image 210 away from edges, eliminating noise in those areas while keeping edge information, and/or from the directional blurring of original image 210, wherein edge information is kept due to the direction of the blur at the edges. Since noise was reduced while desired information, such as edge and color information remained, modified image 240 can be said to have a increased SNR, and could therefore could be considered to be an improved image. In at least one embodiment, modified image 240 is combined with original image 210 as appropriate to further increase the SNR. Signal combination methods are discussed subsequently in greater detail.

Figure 4:
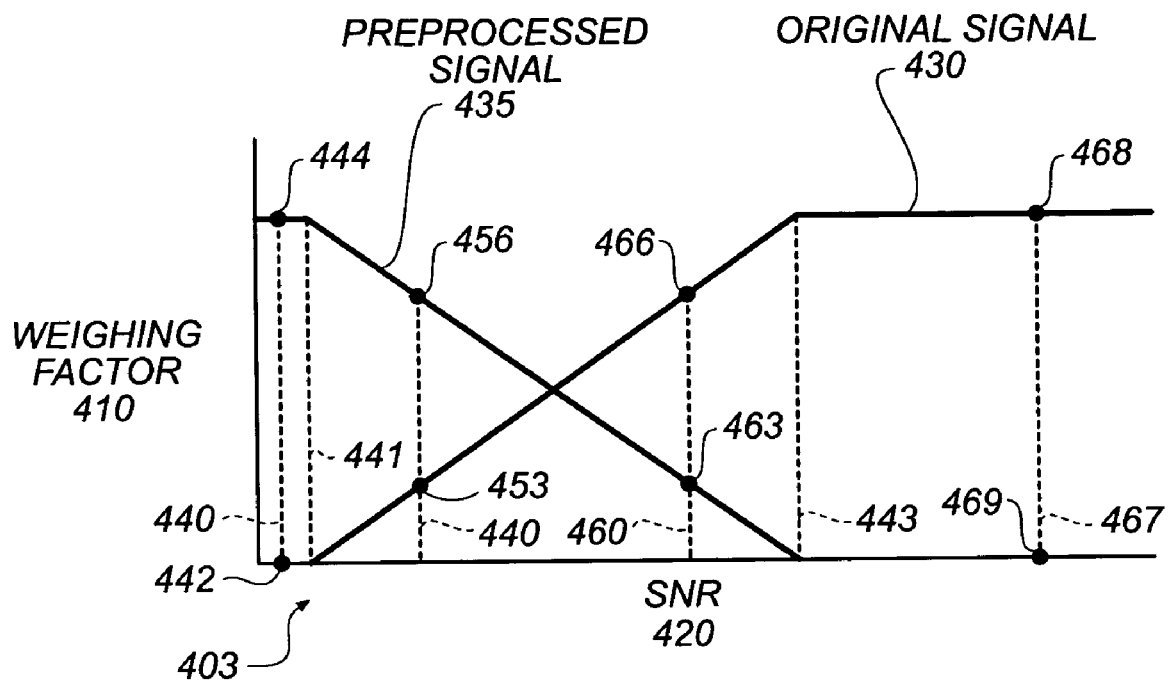
FIG. 4 is a graph diagram illustrating a plurality of methods for combining signals according to at least one embodiment of the present invention.
Figure 4:
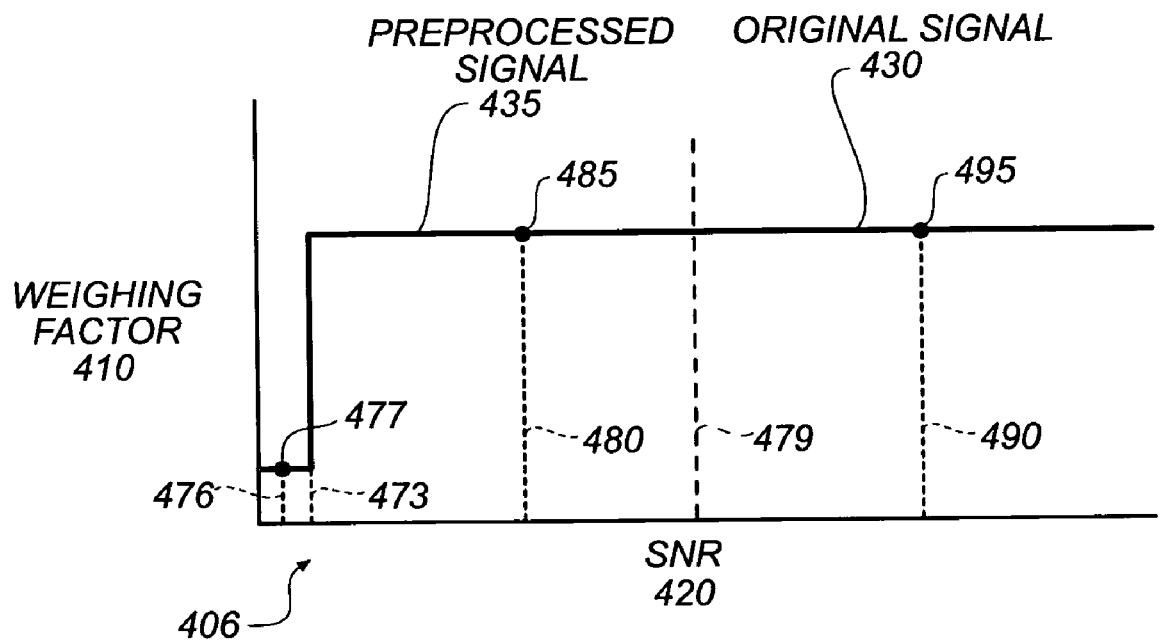

As discussed previously, in at least one embodiment, a preprocessed signal from a lower level is combined with a signal, such as a decomposed signal, from a higher level to generate a modified signal at the higher level. Referring now to FIG. 4, a number of methods for combining signals are discussed according to at least one embodiment of the present invention. First combination method 403 includes a chart representative of a weighted average combination method and second combination method 406 includes a chart representative of a discrete combination method. Although two methods for combination are illustrated, other methods may be utilized according to the present invention.

In at least one embodiment, a lower SNR for a component of (or all of) an original signal can indicated that a preprocessed signal, such as a filtered signal or an up-predicted signal, is more likely to be correct for the given component or entire signal. As a result, the weighting factor (weighting factor 410) associated with each signal can be related to the SNR. As illustrated in first combination method 403, the higher the SNR, the more weight is given to the original signal compared to the preprocessed signal, while the lower the SNR, the more weight is given to the preprocessed signal compared to the original signal.

First combination method 403 includes a chart representative of a weighted average combination method wherein a preprocessed signal and an original signal, such as a base signal or a decomposed signal, are combined based on a weighting factor, generating a modified signal. The ordinate axis represents weighting factor 410, where weighting factor 410 can range from a value of 0, or 0%, to 1, or 100%. The abscissa axis represents the signal-to-noise ratio (SNR 420) of the original signal. In one embodiment, SNR 420 represents a SNR of the original signal as a whole, while in another embodiment, SNR 420 represents a SNR of a given localized portion or component of the original signal. For example, if the original signal and the preprocessed signals are images, then SNR 420 could represent the SNR of a subset of pixels surrounding a pixel in the original image that is to be combined with a corresponding pixel in the preprocessed signal. SNR 420 may be determined using a variety of methods, as discussed previously.

Preprocessed signal function 435 represents a weighting function as applied to the preprocessed signal. Similarly, original signal function 435 represents a weighting function as applied to the original signal. Preprocessed signal function 435 and original signal function 430 can be determined by a user or administrator, determined empirically, determined based on a property or characteristic of the original signal or the processed signal, and the like. Although certain functions for preprocessed signal function 435 and original signal function 430 are illustrated in first combination method 403, various function forms may be utilized. For example, preprocessed signal function 435 and/or original signal function 430 could be an exponential decay/growth function, a linear function, a sinusoidal function, and the like.

In this particular illustration, preprocessed signal function 435 is illustrated as a horizontal line having weighting factor 410 of 1 from a SNR 420 value of 0 until SNR value 441, after which preprocessed signal function 435 is illustrated as a linearly decreasing line until SNR value 443. Preprocessed signal function 435, in this illustration, has a weighting factor 410 value of 0 or 0% for all SNR 420 values greater than SNR value 443. Likewise, original signal function 430 is represented, in this illustration, as a linearly increasing function starting at SNR value 441, where the corresponding weighting factor 410 for original signal function 430 is 0 or 0%. Original signal function 430 linearly increases until SNR value 443, wherein original signal function 430 has a corresponding weighting factor 410 of 1 for all values of SNR 420 greater than SNR value 443.

In one embodiment, the value for a given signal component of the modified signal, such as an intensity value of a pixel of an image, is determined by a weighted combination or averaging of the preprocessed signal and the original signal. The weighting factor for each signal is determined by weighting factor 410 of each signal corresponding to a determined SNR 420 value. For example, if the SNR of the original image is determined to be SNR value 440 then weighting factor 410 for the preprocessed signal is determined by point 444 on preprocessed signal function 435. Similarly, weighting factor 410 for the original signal is determined by point 442 on original signal function 430. The weighted average signal value for the signal component of the modified signal is then the sum of each of the signal values of the corresponding signal component of the original image and the preprocessed image multiplied by their corresponding weighting factors 410. For example, for SNR value 440, weighting factor 410 for the preprocessed signal is determined to be 1.0 (point 444) in this illustration. Weighting factor 410 for the original signal is determined to be 0.0 (point 442) for SNR value 440. If the signal component of the preprocessed signal has a value of 10 units and the correlating signal component of the original signal has a value of 5 units, then the weighted average for corresponding signal component of the resulting modified signal is 10 units (10 units*1.0+10 units*0). In this example, because SNR value 440 is below SNR value 441, the value for a signal component of the preprocessed signal having a SNR value of SNR value 440 is used as value for the corresponding signal component of the modified image, while the value of the corresponding signal component of the original image is discarded.

In another example, SNR value 450 results in weighting factor 410 value of 0.7 (point 456) for preprocessed signal function 435 and weighting factor 410 value of 0.3 (point 453) for original signal function 430. Using the above example, the resulting value for the corresponding signal component of the modified signal is 8.5 units (10 units*0.7+5 units*0.3). Similarly, at SNR value 460, preprocessed signal function 435 and original signal function 430 have weighting factors of 0.3 (point 463) and 0.7 (point 466) respectively. The resulting value for the corresponding signal component of the modified signal is 6.5 units (10 units*0.3+5 units*0.7). In yet another example, at SNR value of 467 the value of the signal component of the original image is used as the value of the corresponding signal component of the modified image while the value from the preprocessed signal is discarded, since weighting factors 410 are 0.0 (point 469) and 1.0 (point 468) for preprocessed signal function 435 and original signal function 430 respectively.

In at least one embodiment, a lower SNR for a signal component of original signal can indicate that the value of the correlated signal component of preprocessed signal, such as a filtered signal or an up-predicted signal, is likely to be more correct for the given signal component. As a result, the weighting factor (weighting factor 410) associated with each signal is based relative to the SNR. As illustrated in first combination method 403, the higher the SNR, the more weight is given to the original signal compared to the preprocessed signal, while the lower the SNR, the more weight is given to the preprocessed signal compared to the original signal.

Second combination method 406 illustrates a discrete method wherein the preprocessed signal value is used as the value of a signal component for the modified signal if the SNR value is below a certain threshold, while the original signal value is used if the SNR value is at or above the certain threshold. In this illustration, preprocessed signal function 435 is illustrated as a horizontal line having a weighting factor 410 value of 1 beginning at SNR value 473 and ending at threshold value 479. Original signal function 430 is illustrated as a horizontal line having a weighting factor 410 value of 1 beginning at threshold value 479 and continuing for all SNR values greater than threshold value 479. Threshold value 479 is used to determine whether a preprocessed signal value or an original signal value should be used for the value of a corresponding signal or signal component of the modified signal that results from second combination method 406. For example, for a signal component having SNR value 480, the signal component value from the preprocessed signal is used for the value of the corresponding signal component of the modified signal. Since SNR value 480 is below threshold value 479, the weighting factor 410 is 1 for preprocessed signal function 435 at point 485. Alternately, with SNR value 490, the signal component value of the original image is used for the corresponding signal component value of the modified image, since SNR value 490 is above threshold value 479. The weighting factor 410 is 1 for original signal function 435 at point 495. It will be appreciated that, in this example, weighting factor 410 for original signal function 430 has a value of 0 when original signal function 435 has a value of 1, and vice versa.

In one embodiment, signal components of the original signal (or the preprocessed signal) having an SNR less than SNR value 473 are handled differently than other signal components. SNR value 473, determined by a user, by empirical methods, etc., can include a threshold where signal information from the original signal (or the preprocessed signal) is considered highly unreliable due to the relatively very low SNR. In this case, a predetermined value could be substituted for the corresponding signal component in the modified signal or the value of the signal component from the original signal could be multiplied by the corresponding weighting factor 410, and the like. For example, for a signal component of the original image having SNR value 476, its value is multiplied by the correlated weighting factor 410 (point 477) and the resulting value is used as the value for the corresponding signal component of the modified signal.

Although two methods for combining signals have been discussed, other methods may be used in accordance with the present invention. For example, if the original signal and the preprocessed signal are images, the pixel values of a given pixel of the original image and the correlated pixel of the preprocessed image could be summed and then divided by two to generated an average value for the corresponding pixel of a modified image. Alternately, the each pixel value could be squared, the squared values summed, and then the square root taken of the sum to generate a value for the corresponding pixel of a modified image. It will be appreciated that a method used to combine two signals is often selected based on signal properties and/or the signal type.

Figure 5:
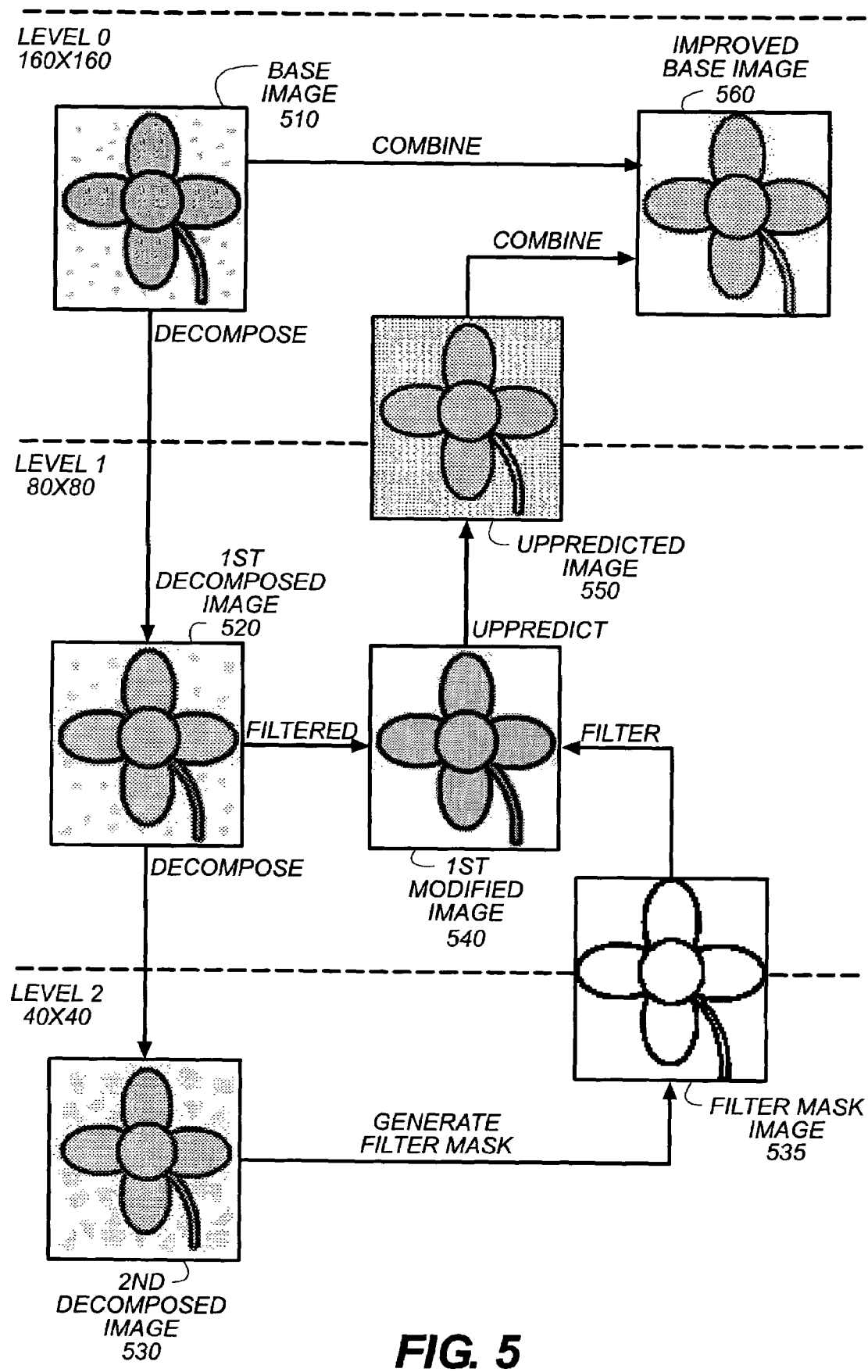
FIG. 5 is a pictorial diagram demonstrating a method for image improvement according to at least one embodiment of the present invention.

Referring next to FIG. 5, a method for pyramidal decomposition of a signal and subsequent improvement of the signal is illustrated by way of an example utilizing base image 510 as the signal to be improved. Base image 510, as previously discussed, could represent an image recorded in a photographic film, an image captured by a digital camera, an image captured using a scanning device, and the like. For this example, base image 510 will be considered to be an image captured from photographic film using a digital film development system. Base image 510, in this example, has noise introduced by grain in the photographic film from which it was derived. At level 0 of a pyramidal decomposition process, base image 510 has a resolution of 160 by 160 pixels.

At level 1, first decomposed image 520 represents a decomposition of base image 510. As discussed previously, base image 510 can be decomposed in a number of ways, such as removing pixels, or averaging pixels and then removing pixels, etc. In this example, first decomposed image 520 has a resolution of 80 by 80 pixels at level 1 of the pyramidal decomposition. It will be appreciated that the noise caused by film grain is often lessened (as is the rest of the image information) as a result of the decomposition.

First decomposed image 520 is decomposed, generating second decomposed image 530. Alternately, base image 510 could be decomposed by a greater decomposition factor than the one used to decompose first decomposed image 520 to generate second decomposed image 530. Second decomposed image 530, with a resolution of 40 by 40 pixels, often has even less noise than first decomposed image 520 as a result of the additional decomposition step.

Filter mask image 535 (a preprocessed image) is generated from second decomposed image 530. Since second decomposed image 530 contains less noise, a filter mask image (filter mask image 535) generated from second decomposed image 530 is considered to be more accurate than a filter mask image generated from an image from a higher level, such as first decomposed image 520, since the increased noise in the image from the higher level could cause incorrect filter information in the filter mask image.

Filter mask image 535 is used to guide a filtering method on first decomposed image 520 to generate first improved image 540. In one embodiment, filter mask image includes information indicating which pixels to blur and which are not to be blurred. For example, filter mask image 535 could include black pixels in locations corresponding to edges or areas of relatively high detail in second decomposed image 530, while all other pixels in filter mask image 535 are white pixels. A filtering process could then select one or more pixels from first decomposed image 520 for blurring, check the corresponding pixels in filter mask image 535 to see if they are black or white pixels. If the corresponding pixels in filter mask image 535 are white, blurring on the pixels from the first decomposed image may proceed, otherwise, if the corresponding pixels in filter mask are black, the pixels from the first decomposed image are skipped over in the blurring process. As discussed previously, grey pixels in filter mask image 535 can be used to determined the level of blurring on the corresponding pixels in first decomposed image 520. The filtering process repeats the process for all subsets of pixels in first decomposed image 520.

In another embodiment, filter mask image 535 includes information indicating a direction of a blur for a plurality of subsets of pixels of first decomposed image 520. A filtering process, such as a match blur, could select a subset of pixels in first decomposed image 520 and determine the blur direction for the subset of pixels from a value corresponding to the subset of pixels in filter mask image 535. For example, filter mask image 535 could have a value between 0 and 360 associated with each subset of pixels, where the value indicates the number of degrees past vertical in which the blur on the subset of pixels occurs. The filtering process repeats the process for all subsets of pixels in first decomposed image 520. It will be appreciated that filter mask image 535 may need to be recomposed or upsampled from a resolution of level 2 (40 by 40 pixels) to the resolution of level 1 (80 by 80 pixels) before it may be used to guide a filtering process on first decomposed image 520.

As a result of the guided filtering process, first modified image 540 is generated. In at least one embodiment, first modified image 540 has an improved SNR since the noise was reduced or eliminated in the blurring process, but image detail was retained. Additionally, in one embodiment, less processing effort and/or time is needed to decompose first decomposed image 520, generate filter mask image 535, and guide a filtering process using filter mask image 535 on first decomposed image 520 at level 2 than is needed to generate a filter mask image at level 1 from first decomposed image 520 and then apply it to first decomposed image 520 since the information (1600 pixels total) to be processed in images in level 2 is one-fourth of the information (6400 pixels total) that would have to be processed in level 1.

First modified image 540 is used to generate up-predicted image 550. As discussed previously, up-predicted image 550 may be generated by methods such as determining edges in first modified image 540 and predicting their composition at a higher resolution, interpolation between pixels, and the like. As discussed previously, the up-predict process, in one embodiment, does not propagate noise from first modified image 540 to up-predicted image 550 as a result of noise detection and elimination algorithms used by the up-prediction process. As a result of the up-prediction process, up-predicted image 550 has the resolution associated with level 0 (160 by 160 pixels) of the pyramidal decomposition.

In this example, up-predicted image 550 is combined with base image 510 to generate improved base image 560. In one embodiment, the SNR for a pixel or a subset of pixels of base image 510 is used to determine the weighting factor (weighting factor 410, FIG. 4) for each image (base image 510 and up-predicted image 550). Recall that the weighting factor is used to determine how much of the value of the corresponding pixel or subset of pixels from each image (base image 510 and up-predicted image 550) is used for the corresponding pixel or subset of improved base image 560. As discussed previously, in one embodiment, the higher the SNR of the corresponding pixel or subset of pixels in base image 510, the more the pixel value from base image 510 is used relative to up-predicted image 550. Alternately, if the SNR is below a predetermined threshold, the pixel value from up-predicted image 550 is used, or if the SNR is above the predetermined threshold, the pixel value from base image 510 is used. Steps for combining signals, such as images, were discussed previously in greater detail with reference to FIG. 4. As a result of the combination of base image 510 and up-predicted image 550, improved base image 560 is generated with decreased noise and/or increased detail compared to base image 510. The method illustrated in the previous example can also be applied to other signal types with the appropriate modifications.

As previously discussed, in at least one embodiment, a signal being processed by one or more methods of the present invention is an image recorded using photographic film. Since the image is represented by the film and cannot be easily manipulated or processed in its current form, in one embodiment, the image recorded in the photographic film is digitized for further processing. Conventional film digitization processes scan the film negative using a conventional electronic scanner to produce a digital image that electronically represents the photographic image. Conventional electronic film scanners generally operate by directing white light through the film negative. The light interacts with the dye image and the intensity of light transmitted through the film is recorded by a sensor that produces individual red, green and blue color data. The sensor color data is used to produce the digital image.

A relatively new process under development is digital film processing (DFP). DFP systems scan the film during the development process. DFP systems apply a thin coat of one or more film processing solutions to the film and then scan the film through the coating. Neither the processing solutions nor the silver compounds within the film are washed from the film. DFP systems may comprise a number of different configurations depending upon the method of film processing and the method of scanning the film. For example, in some embodiments, the metallic silver grains and silver halide are not modified and the film is scanned with visible light. Accordingly, in at least one embodiment, a digital film development system is used to digitize and process one or more images recorded in photographic film. One embodiment of a digital film development system is discussed with reference to FIGS. 6–16.

Figure 6:
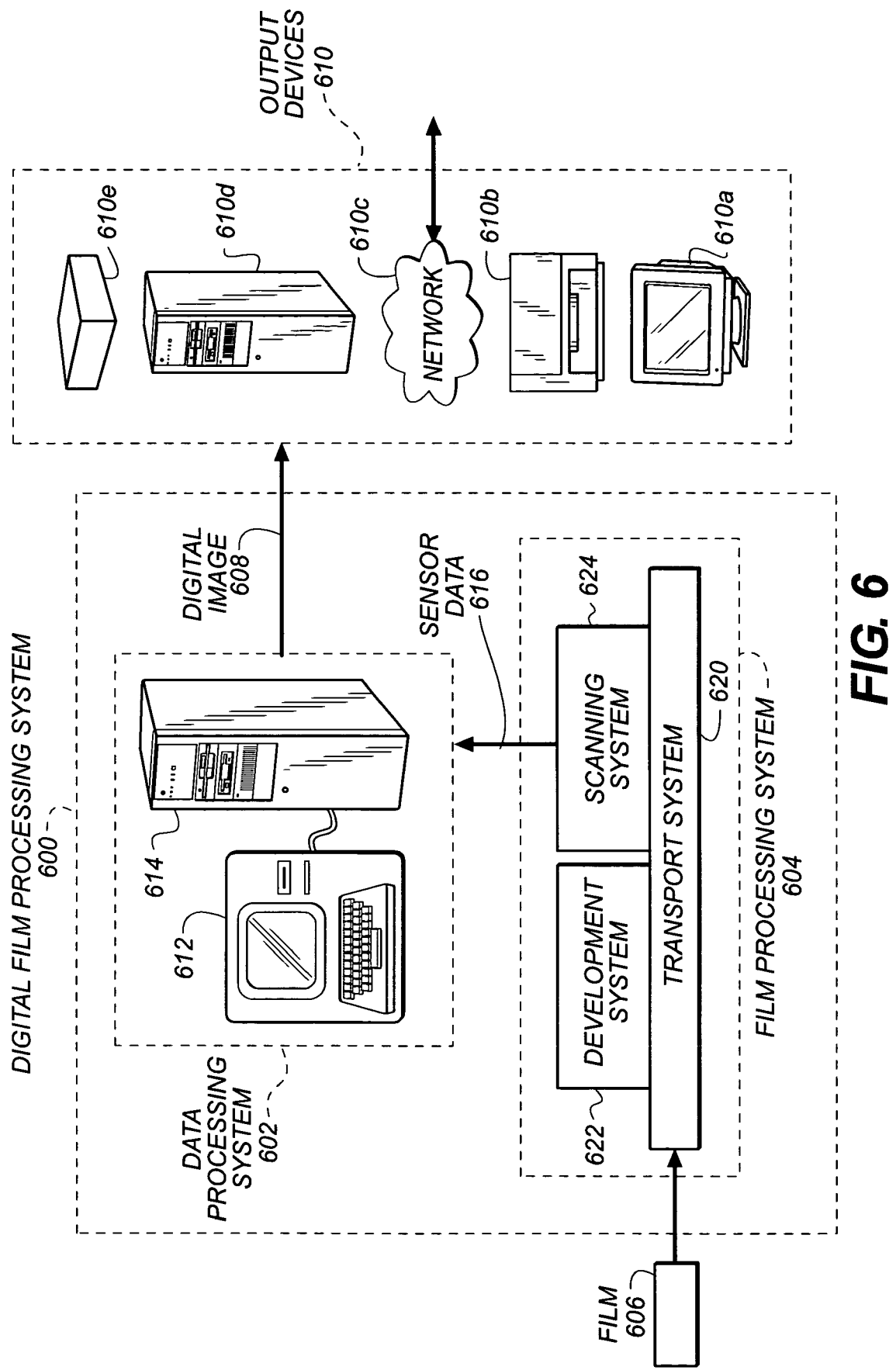
FIG. 6 is a block diagram of an improved digital film development system according to at least one embodiment of the present invention.

FIG. 6 is an example of one embodiment of a digital film development system 600. In this embodiment, the system 600 comprises a data processing system 602 and a film processing system 604 that operates to digitize a film 606 to produce a digital image 608 that can be output to an output device 610. Film 606, as used herein, includes color, black and white, x-ray, infrared or any other type of film and is not meant to refer to any specific type of film or a specific manufacturer.

Data processing system 602 comprises any type of computer or processor operable to process data. For example, data processing system 602 may comprise a personal computer manufactured by Apple Computing, Inc. of Cupertino, Calif. or International Business Machines of New York. Data processing system 602 may also comprise any number of computers or individual processors, such as application specific integrated circuits (ASICs). Data processing system 602 may include a user interface 612 operable to allow a user to input information into the system 600. The user interface 612 generally includes a display and a printer, but may also include such input devices as a keypad, point-of-sale device, voice recognition system, memory reading device such as a flash card reader, or any other suitable data input device.

Data processing system 602 includes image processing software 614 resident on the data processing system 602. Data processing system 602 receives sensor data 616 from film processing system 604. As described in greater detail below, sensor data 616 is representative of the image data and silver in the film 606 at each discrete location, or pixel, of the film 606. The sensor data 616 is processed by image processing software 614 to produce the digital image 608.

The specific embodiment of the image processing software 614 is dependent upon the embodiment of the film processing system 604, and in particular, the specific embodiment of the scanning system, as described below. In an embodiment in which metallic silver grains and/or silver halide remains within the film 606, the image processing software 614 operates to compensate for the silver in the film 606. For example, one embodiment of image processing software 614 comprises software based on U.S. patent application Ser. No. 08/999,421, entitled Defect Channel Nulling, which is incorporated herein by reference. In this embodiment, any silver remaining in the film 606 is treated as a defect and each individual pixel color record is compensated to remove the effect of the silver. In an embodiment in which the metallic silver grains and silver halide have been modified to a substantially transparent silver compound, the film 606 may be scanned using only visible light without digitally compensating for any occlusions. Processing the film 606 without washing the silver from film 606 substantially reduces or eliminates the production of hazardous chemical effluents that are generally produced during conventional film processing methods. Although the image processing software 614 is described in terms of actual software, the image processing software 614 may be embodied as hardware, such as an ASIC. The color records for each pixel form the digital image 608, which is then communicated to one or more output devices 610.

Output device 610 may comprise any type or combination of suitable devices for displaying, storing, printing, transmitting or otherwise outputting the digital image 608. For example, as illustrated, output device 610 may comprise a monitor 610*a*, a printer 610*b*, a network system 610*c*, a mass storage device 610*d*, a computer system 610*e*, or any other suitable output device. Network system 618*c* may be any network system, such as the Internet, a local area network, and the like. Mass storage device 610*d* may be a magnetic or optical storage device, such as a floppy drive, hard drive, removable hard drive, optical drive, CD-ROM drive, and the like. Computer system 610*e* may be used to further process or improve the digital image 608.

As described in greater detail below, film processing system 604 operates electronically scan the film 606 to produce the sensor data 616. Light used to scan the film 606 may include light within the visible portion of the electromagnetic spectrum, light within the infrared portion of the electromagnetic spectrum, a combination of visible and infrared light, or any other suitable electromagnetic radiation. As illustrated, film processing system 604 comprises a transport system 620, a development system 622, and a scanning system 624. Although the system 600 is illustrated with a development system 622, alternative embodiments of the system 600 do not require the development system 622. For example, film 606 may have been preprocessed and not require the development process described below.

Transport system 620 operates to dispense and move the film 606 through the film processing system 604. In one embodiment, the transport system 620 comprises a leader transport system in which a leader is spliced to the film 606 and a series of rollers advances the film 606 through the film processing system 604, with care taken that the image surface of the film 606 is not contacted. Similar transport systems 620 are found in film products manufactured by, for example, Noritsu Koki Co. of Wakayama, Japan, and are available to those in the art.

Figure 7:
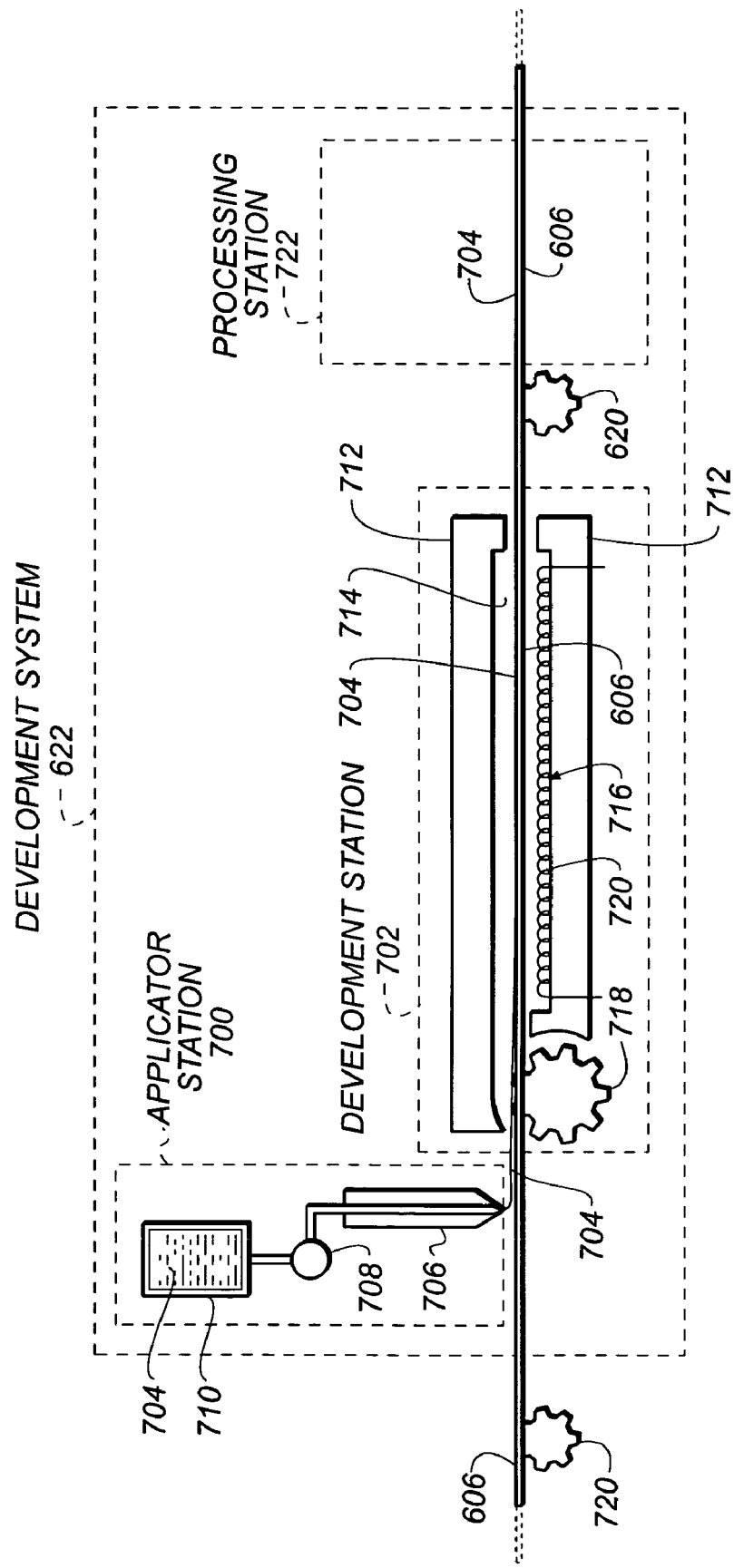
FIG. 7 is a block diagram illustrating a development system, as shown in FIG. 8, according to at least one embodiment of the present invention.

The development system 622 operates to apply one or more processing solutions to the film and develop the film 606, as described in greater detail in FIG. 7. In the preferred embodiment, the processing solution comprises a viscous color developer solution that initiates production of the metallic silver grains and the magenta, cyan and yellow dye images within the film 606. In an alternative embodiment, the processing solution comprises a black and white developer solution that initiates production of the metallic silver grains within the film 606. The processing solution may include other suitable processing agents. The development system 622 may also apply other suitable processing solutions, such as a stop solution, inhibitors, accelerators, bleach solution, fixer solution, blix solution (combines the functionality of a bleach solution and a fixer solution), stabilizer solution and the like.

The scanning system 624 scans the film 606 through the processing solutions applied to the film 606, as described in greater detail in FIGS. 14–18. In other words, the processing solutions are not substantially removed from the film 606 prior to the scanning process. In contrast, conventional film processing systems wash the contaminated processing solutions and hazardous silver compounds from the film and then dry the film to create a conventional film negative prior to any digitization process. The scanning station 624 may comprise a number of different configurations depending, in part, on how the film 606 was developed. In general, specific colors of visible light interact with the dye images and any silver present in the film 606, and infrared light interacts with the silver in the film 606. In some embodiments of the development system 622, the silver (metallic silver and/or silver halide) is modified to reduce the optical effects of the silver. For example, a bleaching agent may be applied to the film 606. The bleaching agent operates to oxidize the metallic silver grains within the film 606 to produce silver halide. The silver halide has a lower optical density than the metallic silver grains. As a result, a greater amount of light is transmitted through the film 606. Another example is a fixer agent. A fixer agent dissolves the silver halide to produce a silver compound that is substantially transparent to light. As a result, light is readily transmitted through the film 606.

The scanning station 624 scans the film 606 using electromagnetic radiation and produces sensor data 616 representative of the film image data, as described in greater detail in FIGS. 14–18. In the preferred embodiment of the scanning station 624, the film 606 is scanned with light within the visible and infrared portions of the electromagnetic spectrum. The visible light measures the light intensity associated with the dye clouds as well as the silver within the film 606, and the infrared light measures the light intensity associated with the metallic silver grains within the film 606. In particular, one or more bands of visible light may be used to scan the film 606. For example, the film 606 may be scanned using visible light within the red, green and/or blue portions of the electromagnetic radiation spectrum. In other embodiments of the scanning station 624, the film 604 is scanned with only visible light, with only infrared light, with different combinations of visible light, or any other suitable electromagnetic radiation. The processing solutions are not substantially removed prior to scanning the film 606. In contrast, conventional film processing systems wash all the processing solutions and silver, both silver halide and metallic silver, from the film 606 prior to any conventional scanning processes. Silver, whether metallic silver or silver halide crystals, in the film negative interferes with the transmission of light through the film negative and would be digitized along with the image. Any silver in the film negative appears as defects in the resulting digital image.

In operation, exposed, but undeveloped film 606 is fed into the transport system 620. The film 606 is transported through the development system 622. The development system 622 applies a processing solution to the film 606 that develops the film 606. The transport system 620 moves the film 606 through the scanning system 624. The scanning system 624 illuminates the film 606 with light. Light from the film 606 is measured by the sensor system, which produces sensor data 616. The sensor data 616 represents film image data in the film 606 at each pixel. The sensor data 616 is communicated to data processing system 602. The data processing system 602 processes the sensor data 616 using image processing software 614 to produce the digital image 608. The data processing system 602 may also operate to improve or otherwise modify the digital image 608. For example, the digital image 608 may be modified in accordance with input from the user. The data processing system 602 communicates the digital image 608 to the output device 610 for viewing, storage, printing, communicating, or any combination of the above.

In a particular embodiment of the digital film development system 600 the system 600 is adapted to a self service film processing system, such as a kiosk. Such a self service film processing system is uniquely suited to new locations because no plumbing is required to operate the self service film processing system. In addition, the developed images can be prescreened by the user before they are printed, thereby reducing costs and improving user satisfaction. In addition, the self service film processing system can be packaged in a relatively small size to reduce the amount of floor space required. As a result of these advantages, a self service film processing system can be located in hotels, college dorms, airports, copy centers, or any other suitable location. In other embodiments, the system 600 may be used for commercial film lab processing applications. Again, because there is no plumbing and the environmental impact of processing the film 606 is substantially reduced or eliminated, the installation cost and the legal liability for operating such a film lab is reduced. The system 600 can be adapted to any suitable application without departing from the scope and spirit of the invention.

FIG. 7 illustrates one embodiment of the development system 622. In this preferred embodiment, a development system 622*a* comprises an applicator station 700 and a development station 702. The applicator station 700 operates to apply a relatively uniform coating of a processing solution 704 to the film 606. In one embodiment, the processing solution 704 comprises a color developer solution, such as Flexicolor Developer for Process C-41 available from the Eastman Kodak Company. In other embodiments, the processing solution 704 comprises other suitable solutions. For example, the processing solution 704 may comprise a monobath solution that acts as a developer and stop solution.

In a particular embodiment, the applicator station 700 comprises an applicator 706, a fluid delivery system 708, and a reservoir 710. The applicator 706 operates to coat the film 606 with the processing solution 704. In the preferred embodiment, as illustrated, the applicator 706 comprises a slot coater device. In alternative embodiments, the applicator 706 comprises an ink jet applicator, a tank, an aerosol applicator, drip applicator, sponge applicator, or any other suitable device for applying the processing solution 704 to the film 606. The fluid delivery system 708 delivers the processing solution 704 from the reservoir 710 to the applicator 706. In an embodiment in which the applicator 706 comprises a slot coater device, the fluid delivery system 708 generally delivers the processing solution 704 at a constant volumetric flow rate to help insure uniformity of coating of processing solution 704 on the film 606. The reservoir 710 contains a sufficient volume of processing solution 704 to process multiple rolls of film 606. In the preferred embodiment, the reservoir 710 comprises a replaceable cartridge. In other embodiments, the reservoir 710 comprises a refillable tank. The applicator station 700 may comprise other suitable systems and devices for applying the processing solution 704 to the film 606.

The development station 702 operates to give the film 606 time to develop prior to being scanned by the scanning system 624. In the embodiment illustrated, the development station 702 forms that portion of the transport system 620 between the applicator 706 and the scanning system 624. The length of the development station 702 is generally dependent upon the development time of the film 606. In particular, depending upon the environment and chemical nature of the processing solution 704, development of the film 606 may require as little as a few seconds to as long as several minutes.

As illustrated, the development station 702 comprises a cover 712 that protects the film 606 during development. The cover 712 forms an environmental chamber 714 surrounding the film 606. The temperature and humidity within the environmental chamber 714 are strictly controlled. To facilitate controlling the temperature and humidity, the environmental chamber 714 has a minimum volume surrounding the film 606. The cover 712 may be insulated to maintain a substantially constant temperature as the film 606 is developed. In order to maintain the temperature, the development station 702 preferably includes a heating system 716. As illustrated, the heating system 716 may include a heated roller 718 and heating element 720. In addition, the heating system 716 may include a processing solution heating system (not expressly shown) that heats the processing solution 704 prior to its application to the film 606.

In an alternative embodiment, the development system 622 includes a processing station 722. The processing station 722 operates to further process the film 606 prior to being scanned by the scanning system 624. For example, in on embodiment, the processing station 722 operates to modify the metallic silver grains and or silver halide in the film 606. Modifying the silver within the film 606 decreases the opacity of the film 606, thereby improving the transmissivity of light through the film 606. In another embodiment, the processing station 722 operates to retard or substantially reduce the continued development of the film 606. Retarding or substantially stopping the continued development of the film 60606 increases the amount of time the film 606 can be exposed to visible light without substantially fogging of the film 606. In another embodiment, the processing station 722 operates to modify the silver and also substantially reduce the continued development of the film 606. FIGS. 8–11 illustrate different examples of the processing station 722.

In operation, transport system 620 transports the film 606 through the applicator station 700. Fluid delivery system 708 dispenses the processing solution 704 from the reservoir 710 through the applicator 706 onto the film 606. The processing solution 704 initiates development of the dye image and silver image within the film 606. The coated film 606 is then transported through the development station 702. As discussed above, the development station 702 allows the film 606 time to develop within a controlled environment. In an alternative embodiment, the film 606 is then transported through the processing station 722 where the film 606 is further processed. The film 606 is then transported by the transport system 620 to the scanning system 624. As described above, the processing solution 704 coated on the film 606 is not removed, but remains on the film 606 as the film 606 is transported to the scanning system 624.

FIG. 8 illustrates a processing station 722a that operates to apply one or more processing solutions 824 to the film 606. As illustrated, the processing station 722a comprises an applicator 706b, a fluid delivery system 708b, and a reservoir 710b, similar in function and design as applicator station 700 described in FIG. 7. Although a single applicator 706b, fluid delivery system 708b, and reservoir 710b is illustrated, the processing station 722a may comprise any number of applicators 706b, fluid delivery systems 708b, and reservoirs 710b that apply other suitable processing solutions 824 and other suitable solutions.

The processing solution 824 may comprise any suitable chemical applied to the film 606 to further process the film 606. In one embodiment, the processing solution 824 includes a fixer solution. As discussed previously, the fixer solution dissolves the silver halide into a substantially transparent silver compound. This has the effect of slightly reducing the opacity of the film 606, but substantially eliminating the sensitivity of the film 606 to any type of light. In another embodiment, the processing solution 824 includes a bleaching agent. The bleaching agent converts the metallic silver within the film 606 into silver halide. As a result, the opacity of the film 606 is greatly reduced, but the sensitivity of the film 606 to light is not substantially reduced. In yet another embodiment, both a bleaching agent and a fixing agent are applied to the film 606, or a single blix solution (combines functions of a bleaching agent and fixing agent). This has the effect of substantially reducing the opacity of the film 606 and also substantially reducing the sensitivity of the film 606 to light. The processing solution 824 may also include an aqueous solution, stopping agents, stabilizing agents, or any other suitable film processing agent or solutions without departing from the scope of the invention.

FIG. 9 illustrates a processing station 722b that operates to chill the developing film 606. Chilling the developing film 606 substantially slows the chemical developing action of the processing solution 704. In the embodiment illustrated, the processing station 722b comprises an electrical cooling roller 926 and insulation shield 928. In this embodiment, the cooling roller 926 is electronically maintained at a cool temperature that substantially arrests the chemical reaction of the processing solution 704. The insulation shield 928 substantially reduces the heat transfer to the cooling roller 926. The processing station 722b may comprise any other suitable system and device for chilling the developing film 606.

FIG. 10 illustrates a processing station 722c that operates to dry the processing solution 704 on the coated film 606. Drying the processing solution 704 substantially stops further development of the film 606 and may also decrease the opacity of the film 606. In the embodiment illustrated, the processing station 722c comprises an optional cooling roller 926, as described in FIG. 9, and a drying system 1030. Although heating the coated film 606 would facilitate drying the processing solution 704, the higher temperature would also have the effect of accelerating the chemical reaction of the processing solution 704 and film 606. Accordingly, in the preferred embodiment, the film 606 is cooled to retard the chemical action of the processing solution 704 and then dried to effectively freeze-dry the coated film 606. Although chilling the film 606 is preferred, heating the film 606 to dry the film 606 can also be accomplished by incorporating the accelerated action of the developer solution 704 into the development time for the film 606. In another embodiment in which a suitable processing solution 824 is applied to the film 606, the chemical action of the processing solution 704 is already minimized and the film 606 can be dried using heat without substantially effecting the development of the film 606. As illustrated, the drying system 1030 circulates air over the film 606 to dry the processing solution 704 and depending upon the embodiment, the processing solution 824. The processing station 722c may comprise any other suitable system for drying the film 606.

FIG. 11 illustrates a processing station 722d that operates to substantially remove excess processing solution 704, and any excess processing solution 824, from the film 606. The processing station 722d does not remove the solutions 704, 824 that are absorbed into the film 606. In other words, even after the wiping action, the film 606 includes some processing solutions 704, 824. Removing any excess processing solution 704 will retard the continued development of the film 606. In addition, wiping any excess processing solutions 704, 824 from the film 606 may improve the light reflectance and transmissivity properties of the coated film 606. In particular, removal of the excess processing solutions 704, 824 may reduce any surface irregularities in the coating surface, which can degrade the scanning operation. In the embodiment illustrated, the processing station 722d comprises a wiper 1132 operable to substantially remove excess processing solution 704 and any processing solution 824. In a particular embodiment, the wiper 1132 includes an absorbent material that wicks away the excess processing solutions 704, 824. In another embodiment, the wiper 1132 comprises a squeegee that mechanically removes substantially all the excess processing solutions 704, 824. The processing station 722d may comprise any suitable device or system operable to substantially remove any excess processing solutions 704, 824.

Although specific embodiments of the processing station 722 have been described above, the processing station 722 may comprise any suitable device or system for further processing the film 606. In particular, the processing station 722 may comprise any suitable combination of the above embodiments. For example, the processing station 722 may comprise an applicator station 700b for applying a processing solution 824, a cooling roller 926, and a drying system 1030. As another example, the processing station 722 may comprise a wiper 1132 and a drying system 1030.

FIG. 12 is a diagram of the scanning system 624. Scanning system 624 comprises one or more scanning stations 1200. Individual scanning stations 1200 may have the same or different architectures and embodiments. Each scanning station 1200 comprises a lighting system 1202 and a sensor system 1204. The lighting system 1202 includes one or more light sources 1206 and optional optics 1208. The sensor system 1204 includes one or more detectors 1210 and optional optics 1212. In operation, the lighting system 1202 operates to produce suitable light 1220 that is directed onto the film 606. The sensor system 1204 operates to measure the light 1220 from the film 606 and produce sensor data 616 that is communicated to the to the data processing system 602.

Each scanning station 1200 utilizes electromagnetic radiation, i.e., light, to scan the film 606. Individual scanning stations 1200 may have different architectures and scan the film 606 using different colors, or frequency bands (wavelengths), and color combinations. In particular, different colors of light interact differently with the film 606. Visible light interacts with the dye image and silver within the film

606. Whereas, infrared light interacts with the silver, but the dye image is generally transparent to infrared light. The term "color" is used to generally describe specific frequency bands of electromagnetic radiation, including visible and non-visible light.

Visible light, as used herein, means electromagnetic radiation having a wavelength or band generally within the electromagnetic spectrum of near infrared light (>700 nm) to near ultraviolet light (<400 nm). Visible light can be separated into specific bandwidths. For example, the color red is generally associated with light within a frequency band of approximately 600 nm to 700 nm, the color green is generally associated with light within a frequency band of approximately 500 nm to 600 nm, and the color blue is generally associated with light having a wavelength of approximately 400 nm to 500 nm. Near infrared light is generally associated with radiation having a wavelength of approximately 700 nm to 1500 nm. Although specific colors and wavelengths are described herein, the scanning station 1200 may utilize other suitable colors and wavelengths (frequency) ranges without departing from the spirit and scope of the invention.

The light source 1206 may comprise one or more devices or a system that produces suitable light 1220. In the preferred embodiment, the light source 1206 comprises an array of light-emitting diodes (LEDs). In this embodiment, different LEDs within the array may be used to produce different colors of light 1220, including infrared light. In particular, specific colors of LEDs can be controlled to produce short duration pulses of light 1220. In another embodiment, the light source 1206 comprises a broad spectrum light source 1206, such as a fluorescent, incandescent, tungsten-halogen, direct gas discharge lamps, and the like. In this embodiment, the sensor system 1204 may include filters for spectrally separating the colors of light 1220 from the film 606. For example, as described below, a RGB filtered trilinear array of detectors may be used to spectrally separate the light 1220 from the film 606. In another embodiment of a broad-spectrum light source, the light source 1206 includes a filter, such as a color wheel, to produce the specified colors of light 1220. In yet another embodiment, the light source 1206 comprises a point light source, such as a laser. For example, the point light source may be a gallium arsenide or an indium gallium phosphide laser. In this embodiment, the width of the laser beam is preferably the same size as a pixel on the film 606 (~12 microns). Filters, such as a color wheel, or other suitable wavelength modifiers or limiters maybe used to provide the specified color or colors of light 1220.

Optional optics 1208 for the lighting system 1202 directs the light 1220 to the film 606. In the preferred embodiment, the optics 1208 comprises a waveguide that directs the light 1220 onto the film 606. In other embodiment, the optics 1220 includes a lens system for focusing the light 1220. In a particular embodiment, the lens system includes a polarizing filter to condition the light 1220. The optics 1208 may also include a light baffle 1222a. The light baffle 1222a constrains illumination of the light 1220 within a scan area in order to reduce light leakage that could cause fogging of the film 606. In one embodiment, the light baffle 1222a comprises a coated member adjacent the film 606. The coating is generally a light absorbing material to prevent reflecting light 1220 that could cause fogging of the film 606.

The detector 1210 comprises one or more photodetectors that convert light 1220 from the film 606 into data signals 616. In the preferred embodiment, the detector 1210 comprises a linear charge coupled device (CCD) array. In another embodiment, the detector 1210 comprises an area array. The detector 1210 may also comprise a photodiode, phototransistor, photoresistor, and the like. In addition, the detector 1210 may utilize time delay integration (TDI) to improve the accuracy detector 1210. The detector 1210 may include filters to limit the bandwidth, or color, detected by individual photodetectors. For example, a trilinear array often includes separate lines of photodetectors with each line of photodetectors having a color filter to allow only one color of light to be measured by the photodetector. Specifically, in a trilinear array, the array generally includes individual red, green, and blue filters over separate lines in the array. This allows the simultaneous measurement of red, green, and blue components of the light 1220. Other suitable types of filters may be used. For example, a hot mirror and a cold mirror can be used to separate infrared light from visible light.

Optional optics 1212 for the sensor system 1204 directs the light 1220 from the film 606 onto the detector 1210. In the preferred embodiment, the optics 1212 comprises a lens system that directs the light 1220 from the film 606 onto the detector 1210. In a particular embodiment, the optics 1212 include polarized lenses. The optics 1212 may also include a light baffle 1222b. The light baffle 1222b is similar in function to light baffle 1222a to help prevent fogging of the film 606.

As discussed previously, individual scanning stations 1200 may have different architectures. For example, light 1220 sensed by the sensor system 1204 may be transmitted light or reflected light. Light 1220 reflected from the film 606 is generally representative of the emulsion layer on the same side of the film 606 as the sensor system 1204. Specifically, light 1220 reflected from the front side (emulsion side) of the film 606 represents the blue sensitive layer and light 1220 reflected from the back side of the film 606 represents the red sensitive layer. Light 1220 transmitted through the film 606 collects information from all layers of the film 606. Different colors of light 1220 are used to measure different characteristics of the film 606. For example, visible light interacts with the dye image and silver within the film 606, and infrared light interacts with the silver in the film 606.

Different architectures and embodiments of the scanning station 1200 may scan the film 606 differently. In particular, the lighting system 1202 and sensor system 1204 operate in concert to illuminate and sense the light 1220 from the film 606 to produce suitable sensor data 616. In one embodiment, the lighting system 1202 separately applies distinct colors of light 1220 to the film 606. In this embodiment, the sensor system 1204 generally comprises a non-filtered detector 1210 that measures in series the corresponding colors of light 1220 from the film 606. In another embodiment, multiple unique color combinations are simultaneously applied to the film 60, and individual color records are derived from the sensor data 616. In another embodiment, the lighting system 1202 simultaneously applies multiple colors of light 1220 to the film 606. In this embodiment, the sensor system 1204 generally comprises a filtered detector 1210 that allows the simultaneous measurement of individual colors of light 1220. Other suitable scanning methods may be used to obtain the required color records.

The use of the processing station 722 may improve the scanning properties of the film 606 in addition to retarding or substantially stopping the continued development of the film 606. For example, the amount of light 1220 transmitted through the film 606 is negatively effected by the opacity of the film 606. In other words, the greater the opacity of the film 606 the lower the amount of light 1220 transmitted through the film 606. Both the silver image and silver halide within the film 606 occlude light 1220. On the whole, the silver image within the film 606 absorbs light 1220, and the silver halide reflects light 1220. As described above, the processing solutions 824 may be used to modify opacity of the film 606 and improve the scanning properties of the film 606.

Specific examples of scanner station 1200 architectures are illustrated in FIGS. 13–18. The scanning system 624 may comprise any illustrated example, combination of examples, or other suitable methods or systems for scanning the film 606 without departing from the scope and spirit of the invention.

FIG. 13 is a schematic diagram illustrating a scanning station 1200a having a transmission architecture. As illustrated, the transmission scanning station 1200a comprises a lighting system 1202a and a sensor system 1204a. Lighting system 1202a produces light 1220a that is transmitted through the film 606 and measured by the sensor system 1204a. The sensor system 1204a produces sensor data 616a that is communicated to the data processing system 602.

Lighting system 1202a and sensor system 1204a are similar in design and function as lighting system 1202 and sensor system 1204, respectively. The visible light 1220a may comprise broadband visible light, individual visible light colors, or combinations of visible light colors. In an embodiment in which the light 1220a comprises broadband visible light, the sensor system 1204a will preferably comprise a red, green and blue tri-linear array. In this embodiment, the sensor system 1204a can simultaneously measure the red, green and blue components of light 1220a from the film 606. In another embodiment, the light 1220a comprises pulses of red, green and blue light, and the sensor system 1204a preferably comprises an unfiltered detector operable to measure the pulses of light 1220a from the film 606. In this embodiment, the color of the light 1220a changes and the sensor system 1204a measures the respective light pulses from the film 606.

In one embodiment of the scanning station 1200a, the light 1220a produced by the lighting system 1202a comprises visible light. The visible light 1220a interacts with at least one dye cloud within the film 606 and any silver occlusions contained in the film 606. In particular, depending upon the embodiment of the development system 622, the film 606 may include silver forming an optical occlusion, such as metallic silver grains, silver halide, or both, but does not include silver compounds formed as a result of fixing the silver halide contained within the film 606.

The visible light 1220a interacts with the magenta, cyan and yellow dye images within the film 606, as well as any silver occlusions within the film 606, the sensor system 1204a records the intensity of visible light 1220a from the film 606 and produces sensor data 616a. The sensor data 616a generally comprises a red, green, and blue record corresponding to the cyan, magenta, and yellow dye images, respectively. Depending upon the development process, each of the red, green, and blue records may include a silver record. Specifically, any metallic silver grains or silver halide within the film 606 partially occludes the visible light 1220a transmitted through the film 606. Depending upon the severity of the occlusions, the red, green, and blue records are processed by the data processing system 602 to correct for the occlusion in the film 606.

In the preferred embodiment of the transmission scanning station 1200a, the light 1220a produced by the lighting system 1202a comprises visible light and infrared light. As discussed above, the visible light may comprise broadband visible light, individual visible light colors, or combinations of visible light colors. The infrared light may comprise infrared, near infrared, or any suitable combination thereof. The visible light 1220a interacts with the dye images, i.e. cyan, magenta, or yellow, within the film 606 and any silver to produce a red, green, and/or blue record that includes a silver record. The infrared light interacts with the silver, and any other occlusions, within the film 606 and produces a silver record. The silver record can then be used to remove, at least in part, the effects of the occlusions contained in the red, green, and blue records. This embodiment is analogous to the defect correction electronic scanners described in U.S. Pat. No. 5,266,805, entitled System and Method for Image Recovery, which is hereby incorporated herein by reference. In this embodiment, any occlusions within the film are analogous to defects that obstruct the optical path of the infrared light. The degree of occlusion is used as a basis for modifying the color records. For example, in pixels having a high occlusion density, the individual color records are significantly increased, whereas in pixels having a low occlusion density, the individual color records are relatively unchanged.

In yet another embodiment of the transmission scanning station 1200a, the light produced by the lighting system 1202a comprises only infrared and/or near infrared light. In this embodiment, the infrared light 1220a interacts with occlusions within the film 606 but does not substantially interact with the dye images within the film 606. In this embodiment, the sensor data 616a does not spectrally distinguish the magenta, cyan, and yellow dye images. An advantage of this embodiment is that the infrared light 1220a does not fog the film 606. In a particular embodiment, the advantage of not fogging the film 606 allows the film 606 to be scanned at multiple development times without significantly fogging the film 606. In this embodiment, the scanning station 1200a can be used to determine the optimal development time for the film 606. This embodiment may also be used to scan the silver image.

FIG. 14 is a schematic diagram illustrating a scanning station 1200b having a reflection architecture. The reflective scanning station 1200b comprises a lighting system 1202b and a sensor system 1204b. Lighting system 1202b produces light 1220b that is reflected from the film 606 and measured by the sensor system 1204b. The scanning station 1200b generally requires silver halide to be present within the film 606. The silver halide scatters and reflects the light 1220b measured by the sensor system 1204b. The sensor system 1204b produces sensor data 616b that is communicated to the data processing system 602. Lighting system 1202b and sensor system 1204b are similar to lighting system 1202 and sensor system 1204, respectively.

In one embodiment of the reflective scanning station 1200b used to scan the blue emulsion layer of the film 606, the light 1220b produced by the lighting system 1202b comprises blue light. In this embodiment, the blue light 1220b scans the silver and dye image within the blue layer of the film 606. The blue light 1220b interacts with the yellow dye image and also the silver in the blue emulsion layer. In particular, the blue light 1220b is reflected from the silver halide and measured by the sensor system 1204b to produce a blue record. Many conventional films 806 include a yellow filter below the blue emulsion layer that blocks the blue light 1220a from illuminating the other emulsion layers of the film 606. As a result, noise created by cross-talk between the blue emulsion layer and the red and green emulsion layers is substantially reduced.

In another embodiment of the reflective scanning station 1200*b* used to scan the blue emulsion layer of the film 606, the light 1220*b* produced by the lighting system 1202*b* comprises non-blue light. It has been determined that visible light other than blue light interacts in substantially the same manner with the various emulsion layers. In this embodiment, infrared light also interacts in substantially the same manner as non-blue light, with the exception that infrared light will not fog the emulsion layers of the film 606. In this embodiment, the non-blue light 1220*b* interacts with the silver image in the blue emulsion layer of the film 606, but is transparent to the yellow dye within the blue emulsion layer of the film 606. This embodiment is prone to higher noise levels created by cross-talk between the blue and green emulsion layers of the film 606.

In yet another embodiment of the reflective scanning station 1200*b*, the light 1220*b* produced by the lighting system 1202*b* comprises visible and infrared light. In this embodiment, blue light interacts with the yellow dye image and the silver image in the blue emulsion layer, green light interacts with magenta dye image and the silver in each of the emulsion layers, red light interacts with the cyan dye image and the silver in each of the emulsion layers, and the infrared light interacts with the silver in each emulsion layer of the film 606. In this embodiment, the sensor system 1204*b* generally comprises a filtered detector 1210*b* (not expressly shown) that measures the red, green, blue, and infrared light 1220*b* from the film 606 to produce red, green, blue, and infrared records as sensor data 616*b*.

Although the scanning station 1200*b* is illustrated with the lighting system 1202*b* and the sensor system 1204*b* located on front side of the film 606, the lighting system 1202*b* and the sensor system 1204*b* may also be located on the back side of the film 606. In this embodiment, the light 1220*b* produced by the lighting system 1202*b* may comprise red light. The red light largely interacts with the cyan dye image and silver in the red emulsion layer of the film 606 to produce a red record of the sensor data 616*b*.

FIG. 15 is a schematic diagram illustrating a scanning station 1200*c* having a transmission-reflection architecture. The transmission-reflection architecture is the preferred embodiment of the scanning system 624. In this embodiment, the scanning station 1200*c* comprises a first lighting system 1202*c*, a second lighting system 1202*d*, and a sensor system 1204*c*. In the preferred embodiment, the lighting system 1202*c* operates to illuminate the front side of the film 606 with light 1220*c*, the second lighting system 1202*d* operates to illuminate the backside of the film 606 with light 1220*d*, and the sensor system 1204*c* operates to measure the light 1220*c* reflected from the film 606 and the light 1220*d* transmitted through the film 606. Based on the measurements of the light 1220*b*, 1220*d*, the sensor system 1204*c* produces sensor data 616*c* that is communicated to the data processing system 602. Lighting system 1202*c* and 1202*d* are similar to lighting system 1202, and sensor system 1204*c* is similar to the sensor system 1204. Although scanning station 1200*c* is illustrated with lighting systems 1202*c*, 1202*d*, a single light source may be used to produce light that is directed through a system of mirrors, shutters, filters, and the like, to illuminate the film 606 with the front side of the film 606 with light 1220*c* and illuminate the back side of the film 606 with light 1220*d*. The light 1220*c*, 1220*d* may comprise any color or color combinations, including infrared tight.

This embodiment of the scanning station 1200*c* utilizes many of the positive characteristics of the transmission architecture scanning station 1200*a* and the reflection architecture scanning station 1200*b*. For example, the blue emulsion layer is viewed better by light 1220*c* reflected from the film 606 than by light 1220*d* transmitted through the film 606; the green emulsion layer is viewed better by light 1220*d* transmitted through the film 606 than by light 1220*c* reflected from the film 606; and the red emulsion layer is adequately viewed by light 1220*d* transmitted through the film 606. In addition, the cost of the scanning station 1200*c* is minimized through the use of a single sensor system 1204*c*.

In the preferred embodiment of the scanning station 1200*c*, the light 1220*c* comprises blue light, and light 1220*d* comprises red, green, and infrared light. The blue light 1220*c* interacts with the yellow dye image and silver in the blue emulsion layer of the film 606. The sensor system 1204*c* measures the light 1220*c* from the film 606 and produces a blue-silver record. The red and green light 1220*d* interacts with the cyan and magenta dye images, respectively, as well as the silver in the film 606. The infrared light 1220*d* interacts with the silver, but does not interact with the dye clouds within the film 606. As discussed previously, the silver contained within the film 606 may comprise silver grains, silver halide, or both. The red, green, and infrared light 1220*d* transmitted through the film 606 is measured by the sensor system 1204*c*, which produces a red-silver, green-silver, and silver record. The blue-silver, red-silver, green-silver, and silver records form the sensor data 616*c* that is communicated to the data processing system 602. The data processing system 602 utilizes the silver record to facilitate removal of the silver component from the red, green, and blue records.

In another embodiment, the light 1220*c* comprises blue light and infrared light, and light 1220*d* comprises red, green, and infrared light. As discussed previously, the blue light 1220*c* mainly interacts with the yellow dye image and silver within the blue emulsion layer of the film 606. The infrared light 1220*c* interacts with mainly the silver in the blue emulsion layer of the film 606. The sensor system 1204*c* measures the blue and infrared light 1220*c* from the film 606 and produces a blue-silver record and a front side silver record, respectively. The red, green, and infrared light 1220*d* interact with the film 606 and are measured by the sensor system 1204*c* to produce red-silver, green-silver and transmitted-silver records as discussed above. The blue-silver, red-silver, green-silver, and both silver records form the sensor data 616*c* that is communicated to the data processing system 602. In this embodiment, the data processing system 602 utilizes the front side silver record of the blue emulsion layer to facilitate removal of the silver component from the blue-silver record, and the transmission-silver record is utilized to facilitate removal of the silver component from the red and green records.

Although the scanning station 1200*c* is described in terms of specific colors and color combinations of light 1220*c* and light 1220*d*, the light 1220*c* and light 1220*d* may comprise other suitable colors and color combinations of light without departing from the scope of the invention. For example, light 1220*c* may comprise non-blue light, infrared light, broadband white light, or any other suitable light. Likewise, light 1220*d* may include blue light, broadband white light, or another other suitable light. Scanning station 1200*c* may also comprise other suitable embodiments without departing from the scope of the invention. For example, although the scanning station 1200*c* is illustrated with two lighting systems 1202 and a single sensor system 1204, the scanning station 1200c could be configured with a single lighting system 1202 and two sensor systems 1204, wherein one sensor system measures light 1220 reflected from the film 606 and the second sensory system 1204 measures light 1220 transmitted through the film 606. In addition, as discussed above, the scanning station 1200 may comprise a single lighting system that illuminates the film 606 with light 1220c and light 1220d.

FIG. 16 is a schematic diagram illustrating a scanning station 1200d having a reflection-transmission-reflection architecture. In this embodiment, the scanning station 1200d comprises a first lighting system 1202e, a second lighting system 1202f, a first sensor system 1204e, and a second sensor system 1204f. In the embodiment illustrated, the lighting system 1202e operates to illuminate the front side of the film 606 with light 1220e, and the second lighting system 1202f operates to illuminate the back side of the film 606 with light 1220f. The first sensor system 1204e operates to measure the light 1220e reflected from the film 606 and the light 1220f transmitted through the film 606, and the second sensor system 1204f operates to measure the light 1220f reflected from the film 606 and the light 1220e transmitted through the film 606. Based on the measurements of the light 1220e and 1220f, the sensor systems 1204e, 1204f produce sensor data 616ef that is communicated to the data processing system 602. Lighting systems 1202e, 1202f are similar to lighting systems 1202, and sensor systems 1204e, 1204f are similar to the sensor system 1204. Although scanning station 1200d is illustrated with lighting systems 1202e, 1202f, and sensor systems 1204e, 1204f, a single lighting system and/or sensory system, respectively, may be used to produce light that is directed through a system of mirrors, shutters, filters, and the like, to illuminate the film 606 with the frontside of the film 606 with light 1220e and illuminate the backside of the film 606 with light 1220f.

This embodiment of the scanning station 1200d expands upon the positive characteristics of the transmission-reflection architecture of scanning station 1200c. For example, as discussed in reference to FIG. 15, the blue emulsion layer is viewed better by light 1220e reflected from the film 606 and the green emulsion layer is viewed better by light 1220e or 1220f transmitted through the film 606. Second sensor system 1204f allows viewing of the red emulsion layer by light 1220f reflected from the film 606, which generally produces better results than viewing the red emulsion layer by light 1220e or light 1220f transmitted through the film 606.

In one embodiment of the scanning station 1200d, the light 1220e and 1220f comprises light within the infrared portion of the electromagnetic spectrum. In this embodiment, the sensor system 1204e measures light 1220e reflected from the front emulsion layer and light 1220f transmitted through the film 606. The sensor system 1204f measures light 1220f reflected from the back emulsion layer and light 1220e transmitted through the film 606. In general, the front measurement corresponds to the blue signal, the back measurement corresponds to the red signal, and the through measurement minus the front and back measurement corresponds to the green signal. In this embodiment, cross-talk exists between the emulsion layers, as the emulsion layers are not spectrally unique using infrared light.

In the preferred embodiment of the scanning station 1200d, the sensor systems 1204e, 1204f include a trilinear array of filtered detectors, and the light 1220e and the light 1220f comprises broadband white light and infrared light. The trilinear array operates to simultaneously measure the individual red, green, and blue components of the broadband white light 1220e, 1220f. The infrared light is measured separately and can be measured through each filtered detector 1210 of the sensor systems 1204e, 1204f. The broadband white light 1220e, 1220f interacts with the silver and magenta, cyan, and yellow color dyes in the film 606, respectively, and the infrared light 1220e, 1220f interacts with the silver within the film 606. The reflected white light 1220e measured by the first sensor system 1204e includes information corresponding to the yellow dye image and the silver in the blue emulsion layer of the film 606. In particular, the blue component of the broadband white light 1220e measured by the blue detector of the sensor system 1204e corresponds to the yellow dye image, and the non-blue components of the broadband white light 1220e measured by the red and green detectors corresponds to the red and green dye images and all the silver within the emulsion layers of the film 606. Similarly, the red component of the broadband white light 1220f measured by the red detector of the sensor system 1204f corresponds largely to the cyan dye image, and the non-red components of the broadband white light 1220e measured by the blue and green detectors corresponds to the yellow and magenta dye images and all the silver within the emulsion layers of the film 606. The white light 1220e, 1220f transmitted through the film 606 interacts with each color dye image and silver within the film 606, and the red, green, and blue light components are measured by the red, green, and blue detectors of the sensor systems 1204e, 1204f to produce individual red, green and blue light records that include the silver record. The infrared light 1220e reflected from the film 606 and measured by the sensor system 1204e corresponds largely to the silver in the blue emulsion layer of the film 606, and the infrared light 1220f reflected from the film 606 and measured by the sensor system 1204f largely corresponds to the silver in the red emulsion layer of the film 606. The infrared light 1220e, 1220f transmitted through the film 606 measured by the sensor systems 1204e, 1204f corresponds to the silver in the red, green, and blue emulsion layers of the film 606. The individual measurements of the sensor systems 1204e, 1204f are communicated to the data processing system 602 as sensor data 616ef. The data processing system 602 processes the sensor data 616ef and constructs the digital image 608 using the various sensor system measurements. For example, the blue signal value for each pixel can be calculated using the blue detector data from the reflected light 1220e and the blue detector data from the transmitted light 1220f, as modified by non-blue detector data from the reflected light 1220e, and the non-blue detector data from the transmitted light 1220e or 1220f. The red and green signal values for each pixel can be similarly calculated using the various measurements.

In another embodiment of the scanning station 1200d, the sensor systems 1204e, 1204f include a trilinear array of filtered detectors, and the light 1220e and the light 1220f comprises broadband white light. This embodiment of the scanning station 1200d operates in a similar manner as discussed above, with the exception that infrared light is not measured or used to calculate the digital image 608.

Although the scanning station 1200d is described in terms of a specific colors and color combinations of light 1220e and light 1220f, the light 1220e and light 1220f may comprise other suitable colors and color combinations of light without departing from the scope of the invention. Likewise, the scanning station 1200*d* may comprise other suitable devices and systems without departing from the scope of the invention.

In the previous detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. The previous detailed description is, therefore, not to be taken in a limiting sense, and the scope of the present invention is defined only by the appended claims.

What is claimed is:

1. A method including the steps of:
   obtaining a base signal including a plurality of signal components;
   performing a higher level pyramidal decomposition of the base signal to generate a higher level decomposed signal;
   performing a lower level pyramidal decomposition of the first decomposed signal to generate a lower level decomposed signal;
   increasing, using the lower level decomposed signal, a ratio of a desired signal component of the higher level decomposed signal to other signal components of the higher level decomposed signal to generate a first modified signal; and
   increasing, using the first modified signal, a ratio of a desired signal component of the base signal to other signal components of the base signal to generate an improved base signal.

2. The method as in claim 1, wherein increasing the ratio of a desired signal component includes reducing the other signal components.

3. The method as in claim 1, wherein increasing the ratio of a desired signal component includes filtering.

4. The method as in claim 1, wherein either increasing step further includes the step of upsampling.

5. The method as in claim 1, further including performing a lower level pyramidal decomposition for a plurality of levels.

6. The method as in claim 1, wherein increasing the ratio of a desired signal component of the higher level decomposed signal includes the steps of:
   up-predicting, using the lower level decomposed signal, the desired signal component of the higher level decomposed signal to generate a first preprocessed signal; and
   combining the first preprocessed signal and the higher level decomposed signal to generate the first modified signal.

7. The method as in claim 6, wherein the step of combining is based on the ratio of a desired signal component to other signal components.

8. The method as in claim 1, wherein increasing the ratio of a desired signal component of a higher level decomposed signal includes the steps of:
   generating, using the lower level decomposed signal, a first filter mask; and
   filtering, using the first filter mask, the higher level decomposed signal to generate a first modified signal.

9. The method as in claim 8, wherein the step of filtering includes using a match blur.

10. The method as in claim 8, further including the step of combining the first modified signal and the higher level decomposed signal.

11. The method as in claim 1, wherein the base signal is a digital representation of an analog signal.

12. A method including the steps of:
    obtaining a base image including a plurality of image components;
    performing a higher level pyramidal decomposition of the base image to generate a first decomposed image;
    performing a lower level pyramidal decomposition of the first decomposed image to generate a second decomposed image;
    increasing, using the second decomposed image, the signal-to-noise ratio of the first decomposed image to generate a first modified image;
    increasing, using the first modified image, the signal-to-noise ratio of the base image to other image components of the base image to generate an improved base image.

13. The method as in claim 12, wherein increasing the signal-to-noise ratio includes reducing noise.

14. The method as in claim 12, wherein increasing the signal-to-noise ratio includes filtering the plurality of image components.

15. The method as in claim 12, wherein either increasing step further includes the step of upsampling.

16. The method as in claim 12, further including performing a lower level pyramidal decomposition for a plurality of levels.

17. The method as in claim 12, wherein increasing the signal-to-noise ratio of the
    higher level image includes the steps of: up-predicting, using the lower level decomposed image, the desired image
    component of the higher level decomposed image to generate a first
    preprocessed image; and combining the first preprocessed image and the higher level decomposed
    image to generate the first image signal.

18. The method as in claim 17, wherein the step of combining is based on the signal-to-noise ratio.

19. The method as in claim 12, wherein increasing the signal-to-noise ratio of the higher level decomposed image includes the steps of:
    generating, using the lower level decomposed image, a first filter mask; and
    filtering, using the first filter mask, the higher level decomposed image to generate a first modified image.

20. The method as in claim 19, wherein the step of filtering includes using a match blur.

21. The method as in claim 19, further including the step of combining the first modified image and a higher level decomposed image.

22. The method as in claim 12, wherein said base image is a digital representation of an image recorded in a physical medium.

23. A digital film development system comprising:
    a film processing system, said film processing system including an image capturing station capable of obtaining sets of data representing an image formed in film; and a data processing system, said data processing system including:
   a processor;
   memory operably coupled to said processor; and
   a program of instructions capable of being stored in said memory and executed by said processor, said program of instructions including instructions to manipulate a processor to:
   obtain a base image including a plurality of image components;
   perform a higher level pyramidal decomposition of the base image to generate a first decomposed image;
   perform a lower level pyramidal decomposition of the first decomposed image to generate a second decomposed image;
   increase, using the second decomposed image, the signal-to-noise ratio of the first decomposed image to generate a first modified image;
   increase, using the first modified image, the signal-to-noise ratio of the base image to other image components of the base image to generate an improved base image.

24. The digital film development system as in claim 23, wherein the instructions to manipulate said processor to increase the signal-to-noise ratio includes instructions to manipulate said processor to reduce noise.

25. The digital film development system as in claim 24, wherein the instructions to manipulate said processor to increase the ratio includes instructions to manipulate said processor to filter the other image components.

26. The digital film development system as in claim 23, further including instructions in either increase step to manipulate said processor to upsample a signal.

27. The digital film development system as in claim 23, further including instructions to manipulate said processor to perform a pyramidal decomposition for a plurality of lower levels.

28. The digital film development system as in claim 23, wherein the instructions
   to manipulate said processor to increase the signal-to-noise ratio further include instructions to manipulate said processor to:
   up-predict, using the lower level decomposed image, the desired image component of the higher level decomposed image to generate a first preprocessed image; and
   combine the first preprocessed image and the higher level decomposed image to generate the first modified signal.

29. The digital film development system as in claim 28, wherein the instructions to manipulate said processor to combine are based on the signal-to-noise ratio.

30. The digital film development system as in claim 23, further including instructions to manipulate said processor to:
   generate, using the lower level decomposed image, a first filter mask; and
   filter, using the first filter mask, the higher level decomposed image to generate a first modified image.

31. The digital film development system as in claim 30, further including instructions to manipulate said processor to filter further includes instructions to manipulate said processor to use a match blur.

32. The digital film development system as in claim 30, further including instructions to manipulate said processor to combine the first modified image and a higher level decomposed image.

33. The digital film development system as in claim 23, wherein said base image is a digital representation of an image recorded in a physical medium.

34. A method of generating a digital image tangibly embodied in a computer readable medium, said method including the steps of:
   obtaining a base image including a plurality of image components;
   performing a higher level pyramidal decomposition of the base image to generate a first decomposed image;
   performing a lower level pyramidal decomposition of the first decomposed image to generate a second decomposed image;
   increasing, using the second decomposed image, the signal-to-noise ratio of the first decomposed image to generate a first modified image; and
   increasing, using the first modified image, the signal-to-noise ratio of the base image to other image components of the base image to generate an improved base image.

35. The method of claim 34, wherein the step of increasing the signal-to-noise ratio includes the step of reducing noise.

36. The method of claim 35, wherein the step of increasing the signal-to-noise ratio includes the step of filtering the plurality of image components.

37. The method of claim 34, wherein either increasing step further the step of upsampling.

38. The method of claim 34, further including performing a pyramidal decomposition for a plurality of lower levels.

39. The method of claim 34, wherein increasing the signal-to-noise ratio of the higher level image includes the steps of:
   up-predicting, using the lower level decomposed image, the desired image component of the higher level decomposed image to generate a first preprocessed image; and
   combining the first preprocessed image and the higher level decomposed image to generate the first image signal.

40. The method of claim 39, wherein the step of combining is based on the signal-to-noise ratio.

41. The method of claim 34, wherein the step of increasing the signal-to-noise ratio includes the steps of:
   generating, using the lower level decomposed image, a first filter mask; and
   filtering, using the first filter mask, the higher level decomposed image to generate a first modified image.

42. The method of claim 41, wherein the step of filtering includes using a match blur.

43. The method of claim 41, further including the step of combining the first modified image and the higher level decomposed image.

44. The method of claim 34, wherein said base image is a digital representation of an image recorded in a physical medium.

45. A computer readable medium tangibly embodying a computer program of instructions
   to manipulate a processor to:
   obtain a base signal including a plurality of signal components;
   perform a higher level pyramidal decomposition of the base signal to generate a higher level decomposed signal;
   perform a lower level pyramidal decomposition of the first decomposed signal to generate a lower level decomposed signal;

increase, using a lower level decomposed signal, a ratio of a desired signal component of the higher level decomposed signal to other signal components of the higher level decomposed signal to generate a first modified signal; and increase, using the first modified signal, a ratio of a desired signal component of the base signal to other signal components of the base signal to generate an improved base signal.

46. The computer readable medium as in claim 45, wherein the instructions to manipulate said processor to increase the ratio includes instructions to manipulate said processor to reduce the other signal components.

47. The computer readable medium as in claim 46, wherein the instructions to manipulate said processor to increase the ratio includes instructions to manipulate said processor to filter the other signal components.

48. The computer readable medium as in claim 45, further including instructions in either increase step to manipulate said processor to upsample a signal.

49. The computer readable medium as in claim 45, further including instructions to manipulate said processor to perform a pyramidal decomposition on a plurality of lower levels.

50. The computer readable medium as in claim 45, wherein the instructions to manipulate said processor to increase the ratio further include instructions to manipulate a said processor to:

up-predict, using the lower level decomposed signal, the desired signal component of the higher level decomposed signal to generate a first preprocessed signal; and combine the first preprocessed signal and the higher level decomposed signal to generate the first modified signal.

51. The computer readable medium as in claim 50, wherein the instructions to manipulate said processor to combine are based on the ratio of a desired signal component to other signal components.

52. The computer readable medium as in claim 45, wherein the instructions to manipulate said processor to increase the ratio further include instructions to manipulate said processor to:

generate, using the lower level decomposed signal, a first filter mask; and filter, using the first filter mask, the higher level decomposed signal to generate a first modified signal.

53. The computer readable medium as in claim 52, wherein the instructions to manipulate said processor to filter further include instructions to manipulate said processor to use a match blur.

54. The computer readable medium as in claim 52, further including instructions to manipulate said processor to combine the first modified signal and the higher level decomposed signal.

55. The computer readable medium as in claim 45, wherein said base signal is a digital representation of an analog signal.

* * * * *